US012576642B2

(12) United States Patent
Nagahashi et al.

(10) Patent No.: US 12,576,642 B2
(45) Date of Patent: Mar. 17, 2026

(54) LIQUID DISCHARGE HEAD, LIQUID DISCHARGE MODULE, AND LIQUID DISCHARGE APPARATUS

(71) Applicants: Kazuto Nagahashi, Kanagawa (JP); Keishi Miwa, Kanagawa (JP); Toshiaki Masuda, Kanagawa (JP)

(72) Inventors: Kazuto Nagahashi, Kanagawa (JP); Keishi Miwa, Kanagawa (JP); Toshiaki Masuda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 181 days.

(21) Appl. No.: 18/499,661

(22) Filed: Nov. 1, 2023

(65) Prior Publication Data

US 2024/0165952 A1 May 23, 2024

(30) Foreign Application Priority Data

Nov. 17, 2022 (JP) ................................ 2022-184445
Oct. 4, 2023 (JP) ................................ 2023-172440

(51) Int. Cl.
*B41J 2/14* (2006.01)

(52) U.S. Cl.
CPC .......... *B41J 2/1433* (2013.01); *B41J 2/14233* (2013.01)

(58) Field of Classification Search
CPC ............................ B41J 2/1433; B41J 2/14233
See application file for complete search history.

(56) References Cited

U.S. PATENT DOCUMENTS

2003/0048328 A1* 3/2003 Inamoto ................. B41J 2/1631 347/44
2004/0145626 A1 7/2004 Stauffer et al.
2009/0153620 A1* 6/2009 Ikegame ................ B41J 2/1404 347/47
2009/0191487 A1 7/2009 Murayama et al.
2014/0267509 A1 9/2014 Shinkai et al.
2015/0022592 A1 1/2015 Aoyama et al.
2015/0070444 A1 3/2015 Ishimori et al.
2015/0077469 A1 3/2015 Kohda et al.
(Continued)

FOREIGN PATENT DOCUMENTS

EP 1293343 3/2003
JP 2002-254637 A 9/2002
(Continued)

OTHER PUBLICATIONS

U.S. Appl. No. 18/116,323, filed Mar. 2, 2023.
(Continued)

*Primary Examiner* — Jason S Uhlenhake
(74) *Attorney, Agent, or Firm* — IPUSA, PLLC

(57) ABSTRACT

A liquid discharge head includes: a nozzle plate having multiple nozzles from each of which a liquid is to be discharged, the multiple nozzles arrayed in a longitudinal direction of the nozzle plate; a channel substrate on the nozzle plate in a lamination direction orthogonal to the longitudinal direction, the channel substrate including: multiple channels arrayed in the longitudinal direction in a channel region of the channel substrate, the multiple channels respectively communicating with the multiple nozzles; a first recess outside the channel region in the longitudinal direction; and a flat portion between the channel region and the first recess in the longitudinal direction.

15 Claims, 15 Drawing Sheets

(56) References Cited

U.S. PATENT DOCUMENTS

| | | | |
|---|---|---|---|
| 2015/0171307 A1 | 6/2015 | Masuda et al. | |
| 2016/0001556 A1 | 1/2016 | Masuda et al. | |
| 2017/0100934 A1 | 4/2017 | Masuda et al. | |
| 2017/0253040 A1 | 9/2017 | Shinkai et al. | |
| 2018/0370237 A1 | 12/2018 | Mizukami et al. | |
| 2019/0044055 A1 | 2/2019 | Kondo et al. | |
| 2019/0270310 A1 | 9/2019 | Masuda et al. | |
| 2019/0275796 A1 | 9/2019 | Miwa | |
| 2019/0291437 A1* | 9/2019 | Kakiuchi | B41J 2/1632 |
| 2020/0298569 A1 | 9/2020 | Miwa | |
| 2020/0298570 A1 | 9/2020 | Masuda et al. | |
| 2021/0016568 A1 | 1/2021 | Miwa | |
| 2021/0036208 A1 | 2/2021 | Shimofuku et al. | |
| 2021/0039393 A1 | 2/2021 | Mizukami et al. | |
| 2021/0162759 A1 | 6/2021 | Miwa et al. | |
| 2021/0252862 A1 | 8/2021 | Masuda | |
| 2021/0370675 A1 | 12/2021 | Yoshita et al. | |
| 2022/0097373 A1 | 3/2022 | Masuda | |
| 2022/0242123 A1 | 8/2022 | Hirabayashi et al. | |
| 2023/0021821 A1 | 1/2023 | Kuroda et al. | |
| 2023/0049164 A1 | 2/2023 | Toyota et al. | |
| 2023/0106664 A1 | 4/2023 | Miwa | |
| 2023/0108462 A1 | 4/2023 | Masuda et al. | |
| 2023/0130058 A1 | 4/2023 | Miwa | |
| 2023/0138126 A1 | 5/2023 | Nagahashi et al. | |
| 2023/0139963 A1 | 5/2023 | Miwa | |
| 2023/0141751 A1 | 5/2023 | Sugioka et al. | |
| 2023/0146297 A1 | 5/2023 | Masuda | |
| 2023/0249461 A1 | 8/2023 | Matsuda et al. | |

FOREIGN PATENT DOCUMENTS

| | | |
|---|---|---|
| JP | 2005-125768 A | 5/2005 |
| JP | 2006-272746 A | 10/2006 |
| JP | 2007-290214 A | 11/2007 |

OTHER PUBLICATIONS

U.S. Appl. No. 18/132,451, filed Apr. 10, 2023.
U.S. Appl. No. 18/197,738, filed May 16, 2023.
U.S. Appl. No. 18/271,848, filed Jul. 12, 2023.
Extended European Search Report for 23207438.5 mailed on Mar. 19, 2024.

* cited by examiner

COMPARATIVE EXAMPLE

LIQUID DISCHARGE HEAD, LIQUID DISCHARGE MODULE, AND LIQUID DISCHARGE APPARATUS

CROSS-REFERENCE TO RELATED APPLICATIONS

This patent application is based on and claims priority pursuant to 35 U.S.C. § 119(a) to Japanese Patent Application No. 2022-184445, filed on Nov. 17, 2022, in the Japan Patent Office, and Japanese Patent Application No. 2023-172440, filed on Oct. 4, 2023, in the Japan Patent Office, the entire disclosure of which are hereby incorporated by reference herein.

TECHNICAL FIELD

The present embodiment relates to a liquid discharge head, a liquid discharge module, and a liquid discharge apparatus.

RELATED ART

There are a liquid discharge head including a nozzle plate on which a nozzle that discharges liquid is formed, and a substrate in which a liquid chamber communicating with the nozzle is formed, a liquid discharge module including the liquid discharge head, and a liquid discharge apparatus. They are used in applications such as liquid application to an object and image formation on an object by liquid.

As the liquid discharge head described above, there is a liquid discharge head in which multiple relief grooves is provided in a peripheral edge of a channel substrate in order to prevent a disadvantage due to liquid leaking from a crack even in a case where the crack occurs in a channel forming substrate forming the liquid discharge head.

SUMMARY

In an aspect of the present disclosure, a liquid discharge head includes: a nozzle plate having multiple nozzles from each of which a liquid is to be discharged, the multiple nozzles arrayed in a longitudinal direction of the nozzle plate; a channel substrate on the nozzle plate in a lamination direction orthogonal to the longitudinal direction, the channel substrate including: multiple channels arrayed in the longitudinal direction in a channel region of the channel substrate, the multiple channels respectively communicating with the multiple nozzles; a first recess outside the channel region in the longitudinal direction; and a flat portion between the channel region and the first recess in the longitudinal direction.

BRIEF DESCRIPTIONS OF DRAWINGS

A more complete appreciation of embodiments of the present disclosure and many of the attendant advantages and features thereof can be readily obtained and understood from the following detailed description with reference to the accompanying drawings, wherein.

Figure 1:
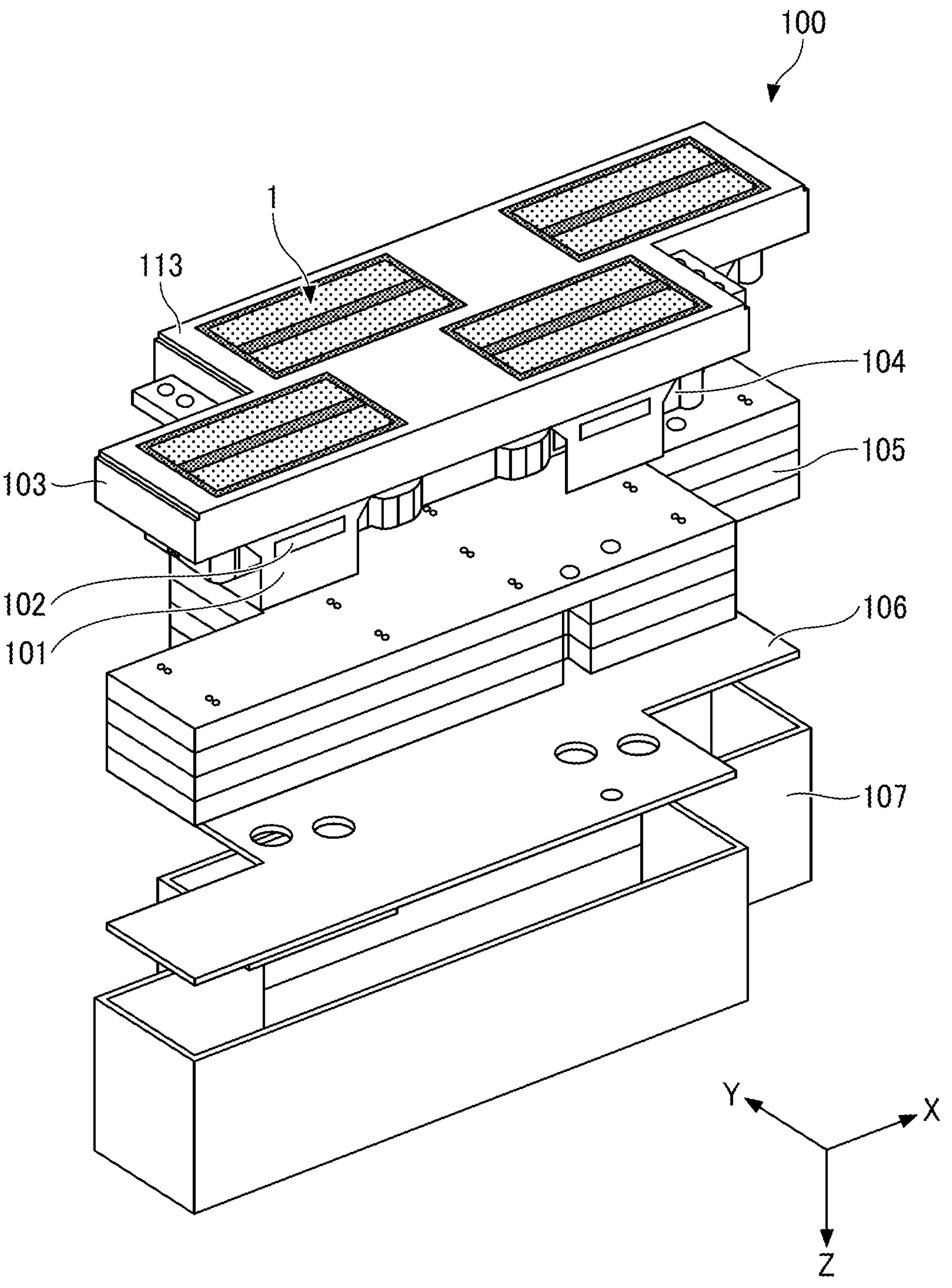
FIG. 1 is an exploded perspective view of an example of a liquid discharge module according to an embodiment.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION OF EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, a liquid discharge head, a liquid discharge module, and a liquid discharge apparatus according embodiments of the present embodiment will be described in detail with reference to the drawings. The following embodiments illustrate a liquid discharge head, a liquid discharge module, and a liquid discharge apparatus for embodying the technical idea of the present embodiment, and it is not limited to the following embodiments. Unless specifically described, dimensions, materials, shapes, and relative arrangements of components described in the embodiments are not intended to limit the scope of the present disclosure only thereto, and are merely illustrative examples. The size and positional relationship of members illustrated in the drawings are sometimes magnified for clarity of description. In the following description, the same names and reference signs indicate the same or similar members, and detailed description thereof will be omitted as appropriate.

In each drawing, orthogonal coordinates having an X axis, a Y axis, and a Z axis are used as direction representations.

The X axis, the Y axis, and the Z axis are substantially orthogonal to each other. A Z direction along the Z axis indicates a thickness direction of a nozzle plate included in the liquid discharge head according to the embodiment. A side in a Z positive direction may be referred to as an upper side, and a side in a Z negative direction may be referred to as a lower side. These direction representations do not limit the direction of the embodiment. In the present specification and claims, a plan view refers to viewing an object in the thickness direction of the nozzle plate included in the liquid discharge head according to the embodiment, that is, in the Z direction.

EMBODIMENTS

Configuration Example of Liquid Discharge Module

An example of a liquid discharge module according to an embodiment will be described.

FIG. 1 is an exploded perspective view of a liquid discharge module 100 according to the embodiment. The liquid discharge module 100 includes multiple liquid discharge heads 1, a base member 103, a cover member 113, a heat dissipation member 104, a manifold 105, a printed circuit board (PCB) 106, and a module case 107. The liquid discharge module 100 corresponds to a liquid discharge module including multiple liquid discharge heads 1 including the liquid discharge head according to the embodiment.

The base member 103 holds the multiple liquid discharge heads 1. The cover member 113 serves as a nozzle cover of the multiple liquid discharge heads 1. The manifold 105 forms a channel for supplying liquid to the multiple liquid discharge heads 1. The printed circuit board 106 is coupled to a flexible wiring board 101.

First Embodiment

Configuration Example of Liquid Discharge Head

Figure 2:
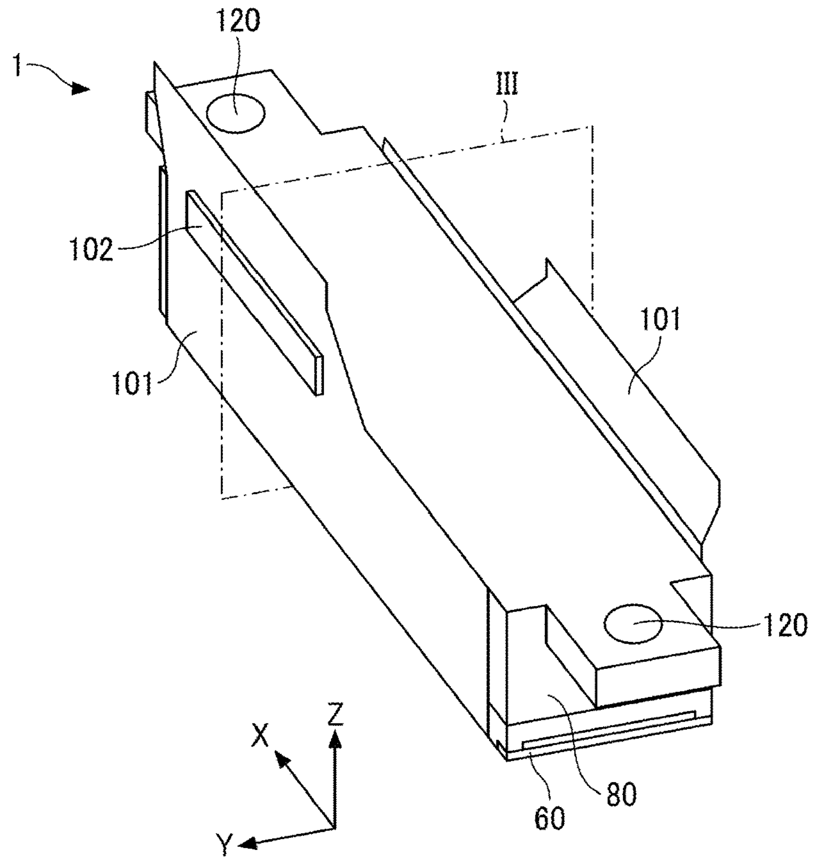
FIG. 2 is an external perspective view of an example of a liquid discharge head according to a first embodiment.
Figure 3:
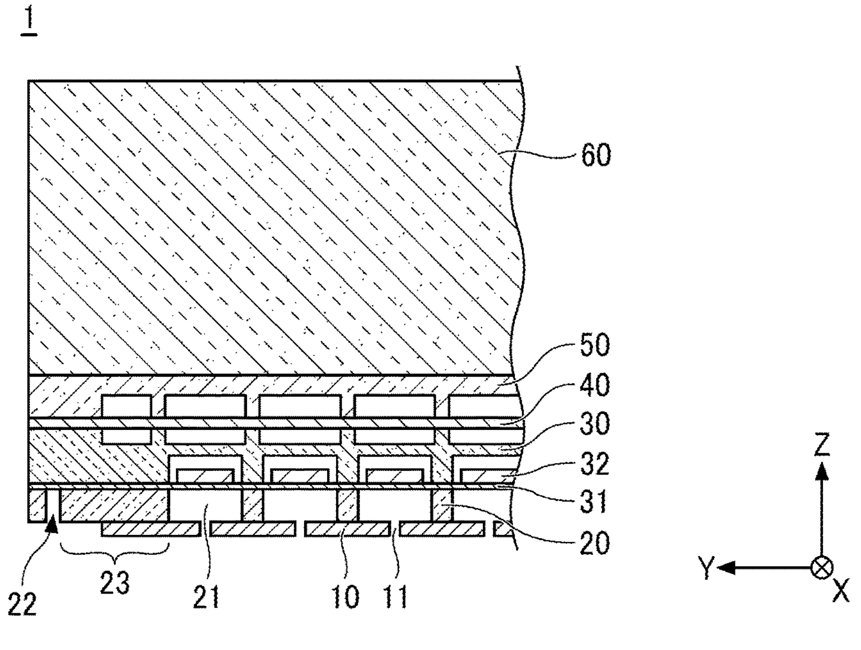
FIG. 3 is a cross-sectional view taken along a plane III in FIG. 2.
Figure 4:
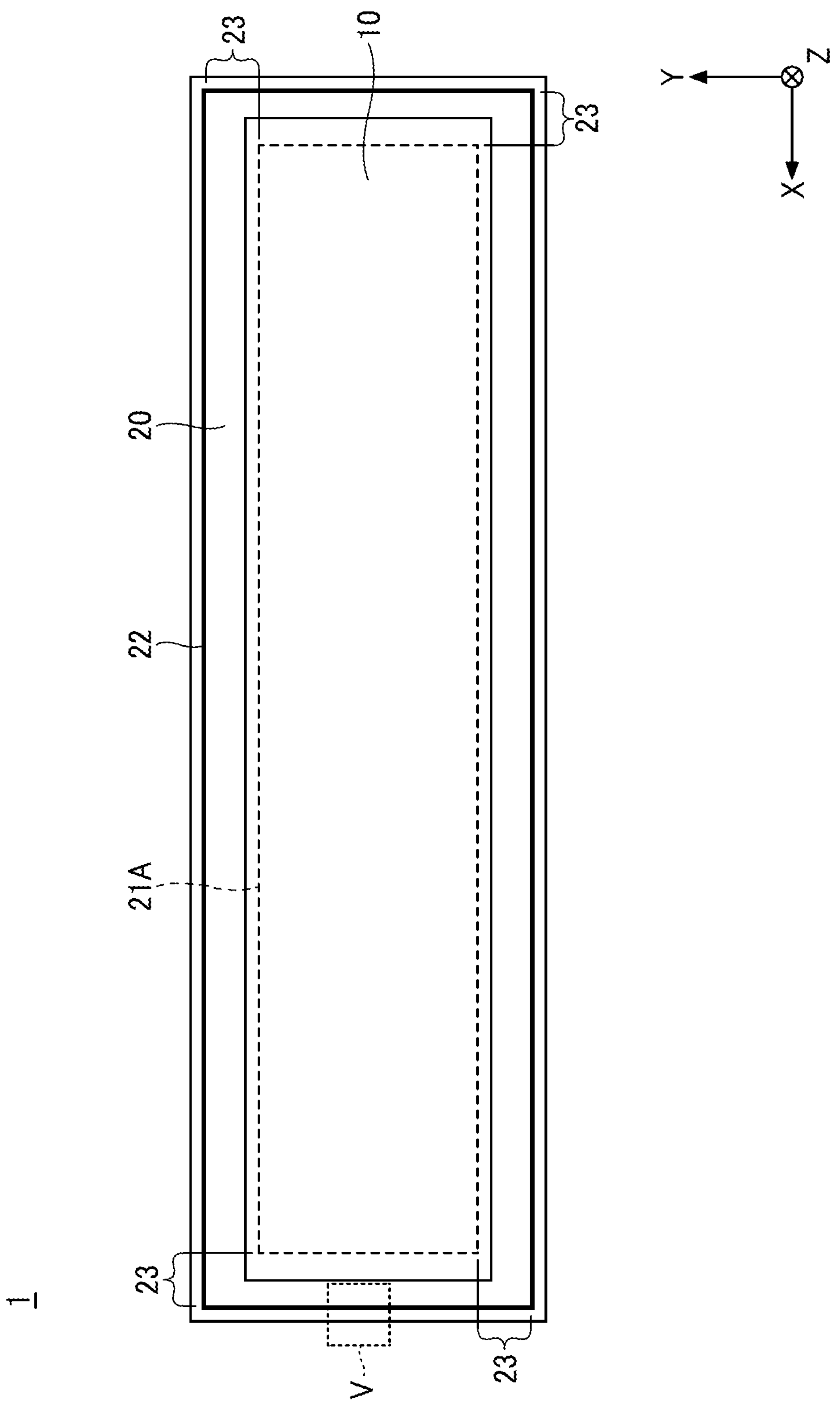
FIG. 4 is a plan view of the liquid discharge head in FIG. 2 as seen from a nozzle plate side.
Figure 5:
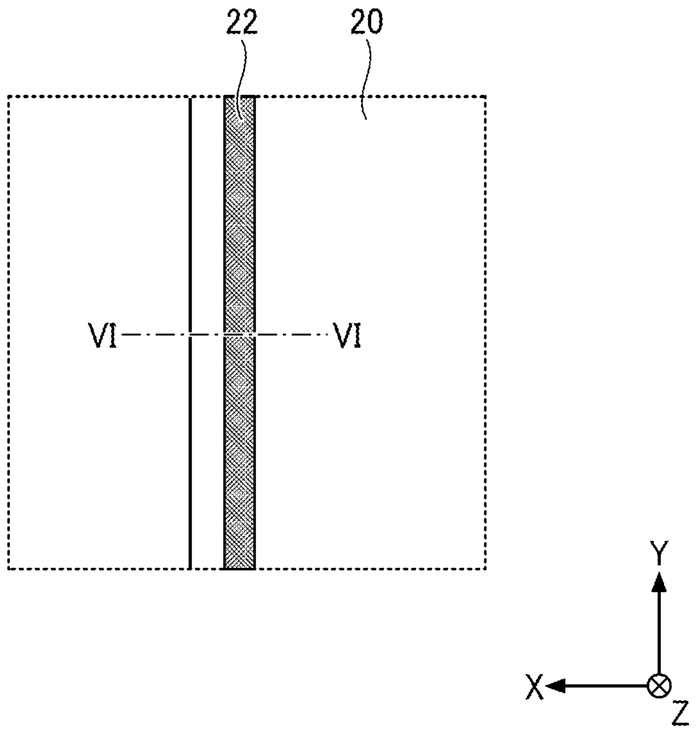
FIG. 5 is an enlarged plan view of a region V in FIG. 4.
Figure 6:
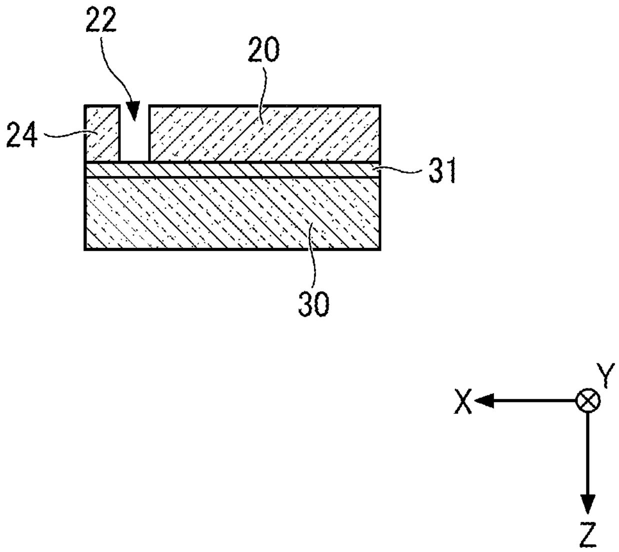
FIG. 6 is a cross-sectional view taken along line VI-VI in FIG. 5.

An example of a configuration of a liquid discharge head 1 according to an embodiment will be described with reference to FIGS. 2 to 6. FIG. 2 is an external perspective view illustrating an example of the liquid discharge head 1. FIG. 3 is a cross-sectional view taken along a plane III in FIG. 2. FIG. 4 is a plan view of the liquid discharge head 1 as seen from a nozzle plate 10 side. FIG. 5 is an enlarged plan view of a region V in FIG. 4. FIG. 6 is a cross-sectional view taken along line VI-VI in FIG. 5.

As illustrated in FIG. 2, the liquid discharge head 1 includes a frame member 80 and a flexible wiring board 101 on which a drive circuit 102 is mounted. As illustrated in FIG. 3, the liquid discharge head 1 includes the nozzle plate 10, a channel substrate 20, a diaphragm member 30, a damper member 40, a damper member holding substrate 50, and a common channel member 60. A hole 120 in FIG. 2 is a through hole into which a screw member is inserted, and is used to secure the liquid discharge head 1 to the member.

The nozzle plate 10 is disposed in a lowermost position in the liquid discharge head 1. The nozzle plate 10 is disposed so as to overlap with the channel substrate 20 in a plan view. The nozzle plate 10 may contain silicon.

The nozzle plate 10 includes multiple nozzles 11 for discharging liquid. The multiple nozzles 11 is formed in a two-dimensional matrix on the nozzle plate 10 in a plan view. The nozzle 11 is not limited to multiple nozzles, but may be one nozzle. Arrangement of the multiple nozzles 11 is not limited to the two-dimensional matrix, and can be appropriately changed according to intended use of the liquid discharge module 100.

The channel substrate 20 is disposed above the nozzle plate 10. As illustrated in FIGS. 3 to 6, in the present embodiment, the channel substrate 20 includes a channel 21, a first recess 22, and a first flat portion 23. The channel 21 communicates with the nozzle 11. In the example described in the present specification, the channel substrate 20 includes multiple channels 21. The multiple channels 21 is arranged to form pairs with the multiple nozzles 11, respectively.

In the present embodiment, the channel substrate 20 may contain silicon. Since the channel substrate 20 contains silicon, sufficient rigidity of the channel substrate 20 can be ensured, and the channel 21 can be easily formed in the channel substrate 20. A material of the channel substrate 20 is not limited to silicon, and may be a semiconductor other than silicon and a metal.

A channel region 21A in the channel substrate 20 indicated by a broken line in FIG. 4 represents a region in which the multiple channels 21 is arranged in a two-dimensional matrix corresponding to the multiple nozzles 11 above the nozzle plate 10. The channel 21 forms a pair with each of the multiple nozzles 11, and may be referred to as an individual chamber from the viewpoint of being a chamber in which the liquid discharged from the nozzle 11 is held. The channel 21 may be referred to as a pressure chamber or a pressurized chamber from the viewpoint of being a chamber in which a pressure is applied to the liquid present inside by a piezoelectric element 32 in order to discharge the liquid from the nozzle 11.

The first recess 22 is a recess formed on a lower surface of the channel substrate 20. The first recess 22 is disposed on an outer side of the channel 21 in a plan view. In other words, the first recess 22 is disposed between the channel 21 and an outer periphery of the channel substrate 20 in a plan view. In other words, the first recess 22 is disposed in a frame-shaped region located between the channel region 21A and the outer periphery of the channel substrate 20 in a plan view.

The first flat portion 23 is a flat portion on the lower surface of the channel substrate 20. The first flat portion 23 is disposed between the channel 21 and the first recess 22 in a plan view.

The diaphragm member 30 is a member including a diaphragm 31 and one or more piezoelectric elements 32.

The diaphragm member 30 is joined to the channel substrate 20 on the side opposite to the nozzle plate 10 across the channel substrate 20. One or more piezoelectric elements 32 are accommodated in one or more grooves included in the diaphragm member 30 in pairs. The diaphragm 31 is a deformable wall surface that defines the channel 21. The piezoelectric element 32 is disposed in contact with the diaphragm 31 in a space formed by the diaphragm 31 and the groove included in the diaphragm member 30. The piezoelectric element 32 is a pressure generator that deforms the diaphragm 31 according to an applied voltage to pressurize the liquid in the channel 21.

The diaphragm member 30 can be formed of, for example, a silicon single crystal substrate having a plane orientation (100).

A thickness of the silicon single crystal substrate is, for example, approximately 400 μm. The diaphragm 31 is deposited on the silicon single crystal substrate.

The diaphragm 31 is fabricated as a silicon oxide film, a polysilicon film, an amorphous silicon film, or a silicon nitride film by laminating and depositing them so as to obtain desired rigidity by a low-pressure chemical vapor deposition (LPCVD) method, for example. The number of laminated layers is preferably three or more and seven or less in consideration of process consistency, rigidity, and stress of an entire diaphragm 31. In order to ensure adhesion to a common electrode, an uppermost layer of the diaphragm 31 may be a silicon oxide film formed by the LPCVD method. Then, for example, a layer of a common electrode 121 made of TiO2 and Pt may be deposited by a sputtering method to have thicknesses of 10 nm and 160 nm, respectively.

The piezoelectric element 32 includes an upper electrode, a lower electrode, and a piezoelectric layer. The upper electrode and the lower electrode contain SRO, platinum (Pt), and gold (Au). The piezoelectric layer contains lead zirconate titanate (PZT), which is a piezoelectric material. For example, PZT is deposited in multiple times by a spin coating method as the piezoelectric layer to be finally deposited with a thickness of 2 μm.

Next, the upper electrode and the lower electrode are deposited to 40 nm and 100 nm, respectively, by a sputtering method. A method of depositing the piezoelectric element 32 is not limited to the spin coating method, and a sputtering method, an ion plating method, an air sol method, a sol-gel method, and an inkjet method can be used. The upper electrode, the lower electrode, and the piezoelectric layer are formed at positions corresponding to the channel 21 by a litho-etch method. In this manner, the piezoelectric element 32 can be formed.

The channel substrate 20 and the diaphragm member 30 are not limited to be separate members. For example, the channel substrate 20 and the diaphragm member 30 can be integrally formed of the same member using a silicon on insulator (SOI) substrate. That is, the SOI substrate obtained by depositing the silicon oxide film, the silicon layer, and the silicon oxide film in this order on the silicon substrate can be used, the silicon substrate can be made the channel substrate 20, and the silicon oxide film, the silicon layer, and the silicon oxide film can be made the diaphragm 31. In such a configuration, the layer structure of the silicon oxide film, the silicon layer, and the silicon oxide film in the SOI substrate forms the diaphragm member 30. In this manner, the diaphragm member 30 may be formed of materials deposited on a surface of the channel substrate 20.

The damper member 40 is disposed above the diaphragm member 30. The damper member 40 dissipates vibration energy generated by drive of the piezoelectric element 32 to reduce impact or vibration amplitude. As a damper material of the damper member 40, a metal thin film or an inorganic thin film resistant to organic solvents is preferably used. A thickness of the damper member 40 is preferably 10 μm or less.

The damper member holding substrate 50 is disposed above the damper member 40. The damper member holding substrate 50 is a substrate having a space in which the damper member 40 can vibrate. The damper member holding substrate 50 includes a metal material, and a semiconductor material.

The common channel member 60 is disposed above the damper member holding substrate 50. The common channel member 60 includes a common channel through which liquid to be supplied to the two or more channels 21 and liquid to be collected from the two or more channels 21 flow. For example, the common channel member 60 includes, as the common channel, multiple common supply branch channels communicating with the two or more channels 21, multiple common collection branch channels communicating with the two or more channels 21, one or more common supply channel mainstreams communicating with the multiple common supply branch channels, and one or more common collection channel mainstreams communicating with the multiple common collection branch channels.

A protective film (also referred to as a liquid contact film) for protecting an inner wall surface from liquid (for example, ink) flowing in the channel is formed on the inner wall surface of the common channel in the common channel member 60. For example, heat treatment of the silicon substrate is performed on the inner wall surface of the common channel to form a silicon oxide film on a surface thereof. A tantalum silicon oxide film to protect the surface of the silicon substrate from the ink is formed on the silicon oxide film. Portions other than the inner wall surface of the common channel member 60 include a semiconductor and a metal material.

By using silicon as a base material of the diaphragm member 30, the damper member holding substrate 50, and the common channel member 60, rigidity of these members can be increased, and processing of these members can be facilitated.

Here, a defect such as deformation, chipping, and cracking (hereinafter, simply referred to as a defect) might occur in the channel substrate included in the liquid discharge head due to application of an external force to the outer periphery. In particular, in a case where the nozzle plate and the channel substrate contain crystals such as silicon, the defect is likely to occur due to cleavage and cracking. When such defect extends inward from the outer periphery of the channel substrate in a plan view and arrives at the channel located on an inner side of the channel substrate, there is a case where quality abnormality occurs in the liquid discharge head and a desired function of the liquid discharge head is not obtained. Examples of the quality abnormality include leakage of the liquid in the channel through the defect, a change in volume of the channel from a desired volume according to the defect, and disconnection of wiring provided in the vicinity of the channel.

In the present embodiment, the channel substrate 20 includes the first recess 22 disposed on the outer side of the channel 21 and the first flat portion 23 disposed between the channel 21 and the first recess 22 in a plan view. The first recess 22 and the first flat portion 23 prevent the defect occurring on the outer periphery of the channel substrate 20 from extending toward the inner side of the channel substrate 20 in a plan view, so that it is possible to reduce arrival of the defect to the channel 21 located on the inner side of the channel substrate 20. As a result, in the present embodiment, the quality abnormality of the liquid discharge head 1 due to the defect can be reduced, and the liquid discharge head 1 having an excellent quality can be provided.

In the present embodiment, as illustrated in FIG. 6, the first recess 22 may be a hole penetrating the channel substrate 20 in a thickness direction of the channel substrate 20. In the example illustrated in FIG. 6, the first recess 22 penetrates the channel substrate 20 in the thickness direction of the channel substrate 20 to arrive at the diaphragm 31. By forming the first recess 22 as a through hole, an inner region and an outer region 24 across the first recess 22 can be divided in a plan view, so that it is possible to reduce the extension of the defect occurring on the outer periphery of the channel substrate 20 to an inner side of the first recess 22 as compared with a case where the first recess 22 is not a through hole but a blind hole. As a result, in the present embodiment, it is possible to reduce the quality abnormality of the liquid discharge head 1 due to the defect and to provide the liquid discharge head 1 having the excellent quality. Since it is not necessary to define or adjust a depth of the through hole, this is easily formed as compared with the blind hole. Therefore, since the first recess 22 is the through hole, the first recess 22 can be easily formed.

The first recess 22 is not limited to the through hole, and may be a blind hole other than the through hole.

In the present embodiment, as illustrated in FIG. 4, the first recess 22 may be formed on an entire periphery of the channel region 21A, that is, an entire periphery of the channel 21 in a plan view. In this case, the first recess 22 is a groove formed on the entire periphery of the channel 21. The first flat portion 23 is a frame-shaped region located between the channel 21 and the first recess 22 in a plan view. With this configuration, regardless of a position on the outer periphery of the channel substrate 20 where the defect occurs, the first recess 22 and the first flat portion 23 can prevent the defect from extending toward the inner side of the channel substrate 20. As a result, it is possible to reduce arrival of the defect occurring on the outer periphery of the channel substrate 20 to the channel 21 located on the inner side of the channel substrate 20 in a plan view, and it is possible to reduce deterioration in quality of the liquid discharge head 1 due to the defect. It is not necessary that the first recess 22 is formed on the entire periphery of the channel 21 in a plan view, and this may be formed in a part of the periphery of the channel 21.

In the example illustrated in FIG. 4, the configuration in which the shape of the first recess 22 formed on the entire periphery of the channel 21 is substantially rectangular in a plan view is exemplified, but there is no limitation, and the shape may be substantially circular, substantially triangular, and substantially polygonal.

Second Embodiment

Next, a liquid discharge head according to a second embodiment will be described. The same names and reference signs as those in the previously described embodiment represent the same or equivalent members or components, and detailed description thereof will be omitted as appropriate. The same applies to the following embodiments.

The present embodiment is mainly different from the first embodiment in that a first recess includes multiple recesses discretely formed at a first interval in a direction along an outer periphery of a channel substrate in a plan view.

Figure 7:
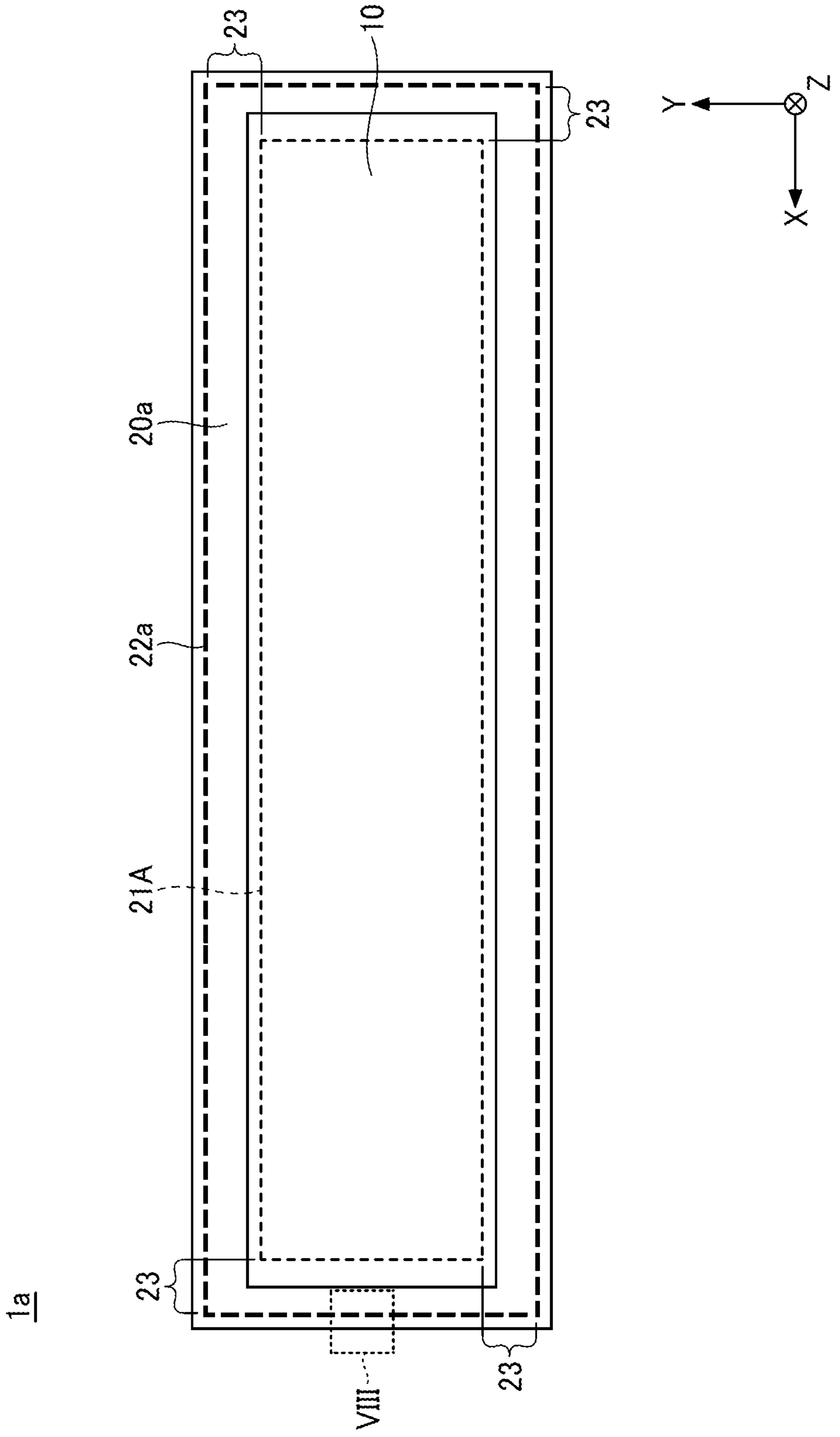
FIG. 7 is a plan view of a liquid discharge head according to a second embodiment as seen from a nozzle plate side.
Figure 8:
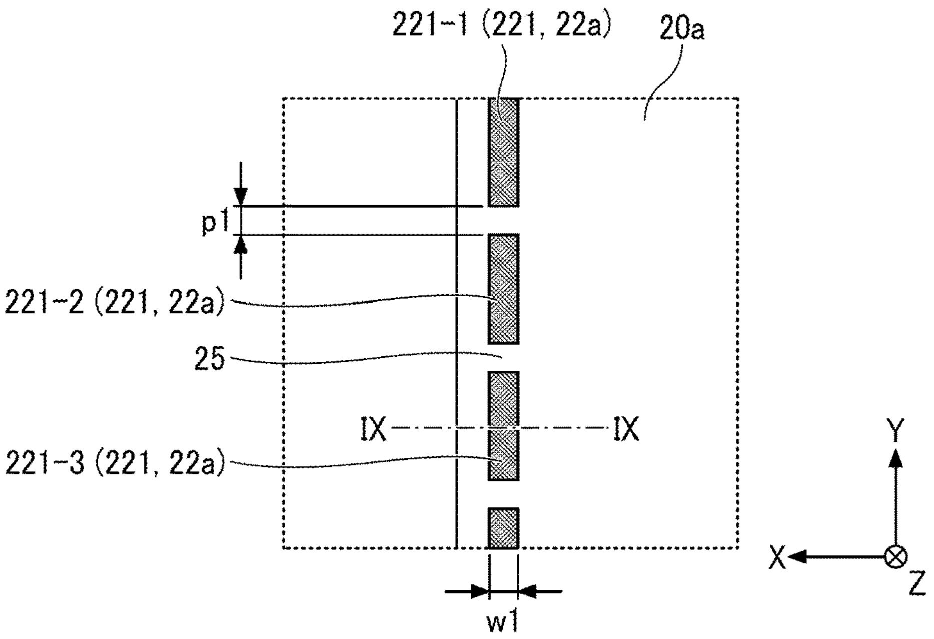
FIG. 8 is an enlarged plan view of a region VIII in FIG. 7.
Figure 9:
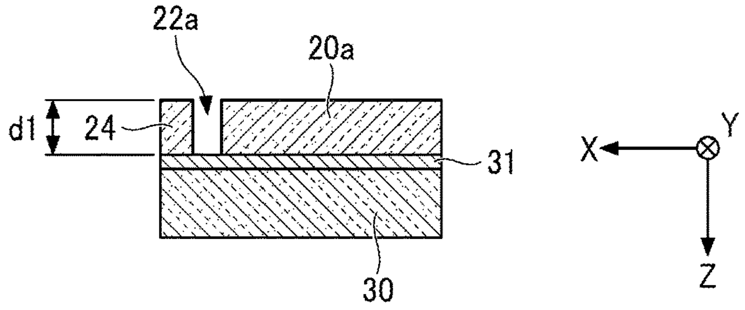
FIG. 9 is a cross-sectional view taken along line IX-IX in FIG. 8.

FIG. 7 is a plan view of a liquid discharge head 1*a* according to the second embodiment as seen from a nozzle plate 10 side. FIG. 8 is an enlarged plan view of a region VIII in FIG. 7. FIG. 9 is a cross-sectional view taken along line IX-IX in FIG. 8.

As illustrated in FIGS. 7 to 9, the liquid discharge head 1*a* includes a channel substrate 20*a*. In the present embodiment, the channel substrate 20*a* includes a first recess 22*a*. As illustrated in FIG. 8, the first recess 22*a* includes multiple recesses 221 discretely arranged at a first interval 25 in a direction along an outer periphery of the channel substrate 20*a* in a plan view. The direction along the outer periphery of the channel substrate 20*a* is a longitudinal direction of the channel substrate 20*a* (for example, an X direction) or a transverse direction of the channel substrate 20*a* (for example, a Y direction). In the example illustrated in FIG. 8, the direction along the outer periphery of the channel substrate 20*a* is the Y direction.

The first recess 22*a* includes multiple recesses 221 formed on an entire periphery of the channel region 21A, that is, the channel 21. In FIG. 8, recesses 221-1, 221-2, and 221-3 are part of the multiple recesses 221 included in the first recess 22*a*.

For example, when the first recess is formed not discretely but continuously in the direction along the outer periphery of the channel substrate, a thickness in a direction orthogonal to the direction along the outer periphery of a portion on an outer side of the first recess in the channel substrate is reduced, and strength of this portion might be reduced. Due to the reduction in strength of the portion, a defect is likely to occur in the channel substrate according to an external force or an impact.

In the present embodiment, since the first recess 22*a* includes the multiple discretely arranged recesses 221, the strength of the portion on the outer side of the first recess 22*a* in the channel substrate 20*a* can be made higher than that in a case where the first recess is continuously formed. As a result, it is possible to reduce occurrence of the defect in the channel substrate 20*a* and to provide the liquid discharge head 1*a* having an excellent quality.

In the present embodiment, as illustrated in FIG. 8, a minimum length p1 of the first interval 25 may be shorter than a maximum width w1 of the first recess 22*a* in the direction orthogonal to the direction along the outer periphery of the channel substrate 20*a* in a plan view. In a case where the direction along the outer periphery of the channel substrate 20*a* is the longitudinal direction of the channel substrate 20*a*, the direction orthogonal to the direction along the outer periphery of the channel substrate 20*a* is the transverse direction of the channel substrate 20*a*. In a case where the direction along the outer periphery of the channel substrate 20*a* is the transverse direction of the channel substrate 20*a*, the direction orthogonal to the direction along the outer periphery of the channel substrate 20*a* is the longitudinal direction of the channel substrate 20*a*. In the example illustrated in FIG. 8, the direction orthogonal to the direction along the outer periphery of the channel substrate 20*a* is the X direction.

By making the minimum length p1 shorter than the maximum width w1 in a plan view, the strength of the portion of the first interval 25 in the channel substrate 20*a* can be reduced. As a result, it is possible to reduce the extension of the defect occurring on the outer periphery of the channel substrate 20*a* to the inner side of the channel substrate 20*a* in a plan view, and to provide the liquid discharge head 1*a* having an excellent quality.

In the present embodiment, as illustrated in FIGS. 8 and 9, the length of the maximum depth d1 of the first recess 22*a* may be longer than the minimum length p1 of the first interval 25. With this configuration, the strength of the portion of the first interval 25 in the channel substrate 20*a* can be reduced. As a result, it is possible to reduce the extension of the defect occurring on the outer periphery of the channel substrate 20*a* to the inner side of the channel substrate 20*a* in a plan view, and to provide the liquid discharge head 1*a* having an excellent quality.

In the example illustrated in FIG. 7, the configuration in which the shape of the first recess 22*a* formed on the entire periphery of the channel 21 is substantially rectangular in a plan view is exemplified, but there is no limitation, and the shape may be substantially circular, substantially triangular, and substantially polygonal.

Effects of the present embodiment other than those described in the description of the present embodiment are substantially the same as those of the first embodiment.

Third Embodiment

Next, a liquid discharge head according to a third embodiment will be described. This embodiment is mainly different from the above-described embodiments in that a channel substrate includes a second recess disposed between a channel and a first recess and a second flat portion disposed between the channel and the second recess in a plan view.

Figure 10:
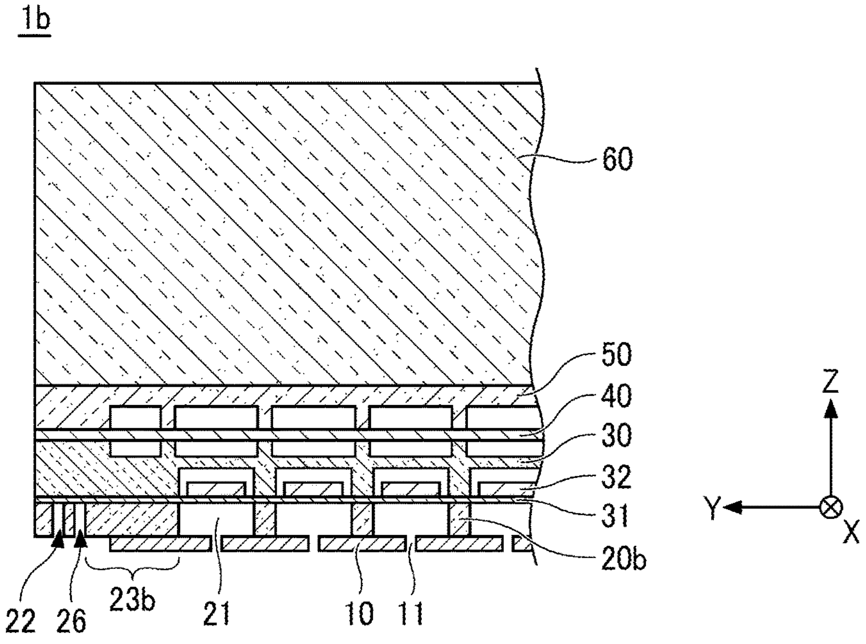
FIG. 10 is a cross-sectional view illustrating an example of a liquid discharge head according to a third embodiment.
Figure 11:
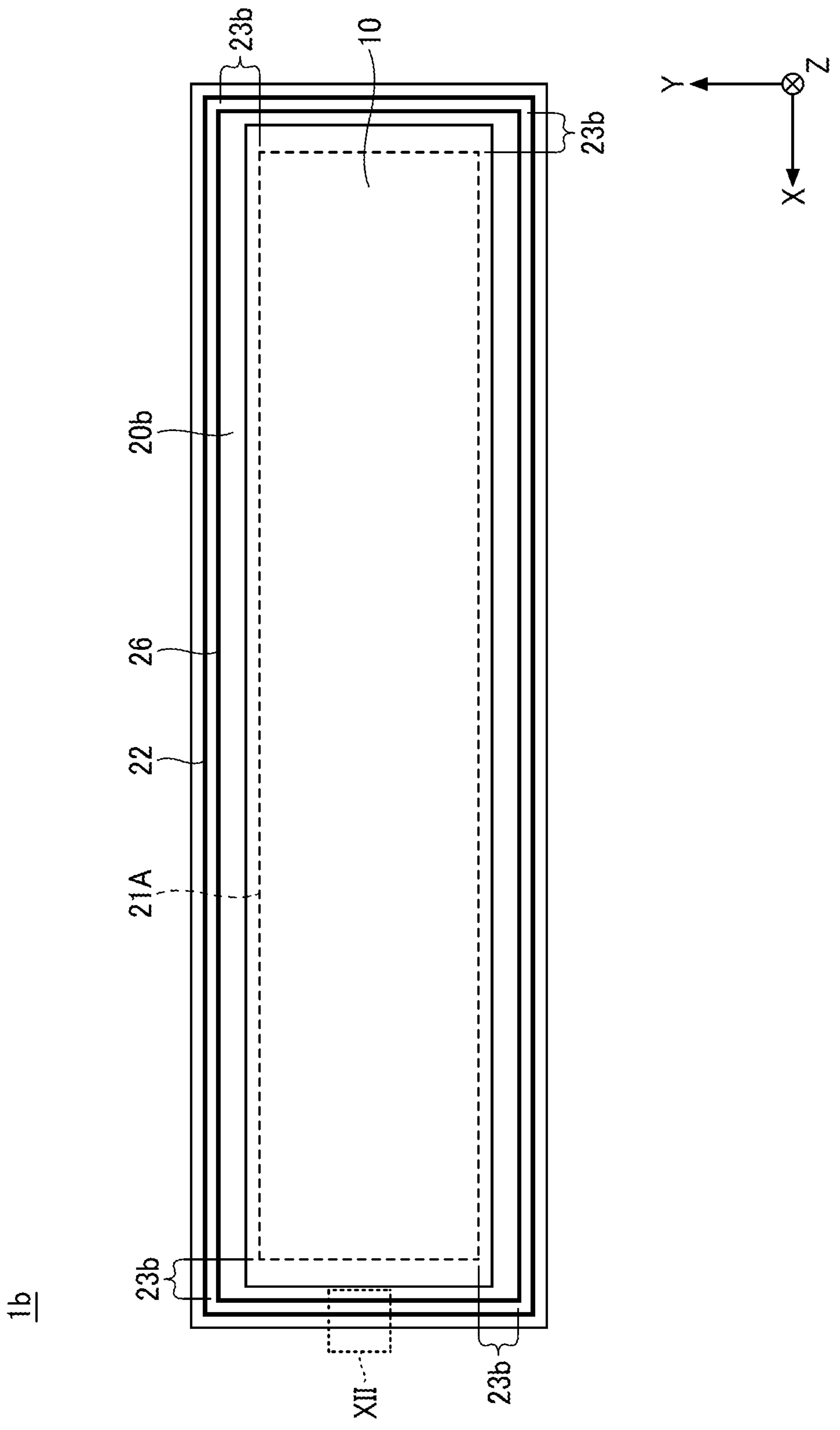
FIG. 11 is a plan view of the liquid discharge head in FIG. 10 as seen from a nozzle plate side.
Figure 12:
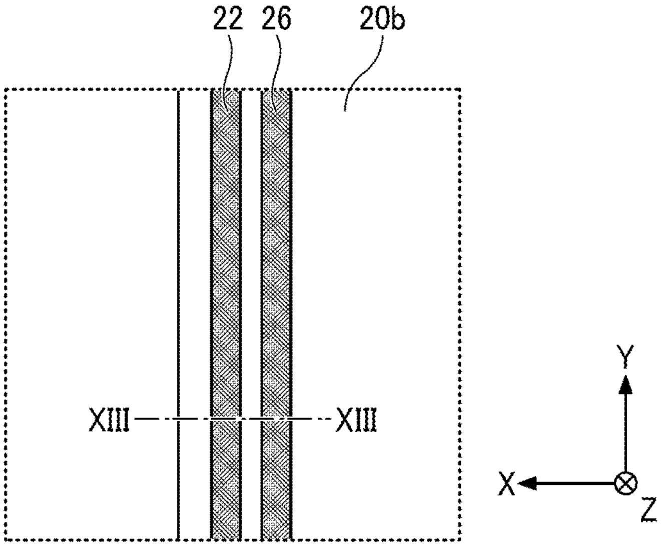
FIG. 12 is an enlarged plan view of a region XII in FIG. 11.
Figure 13:
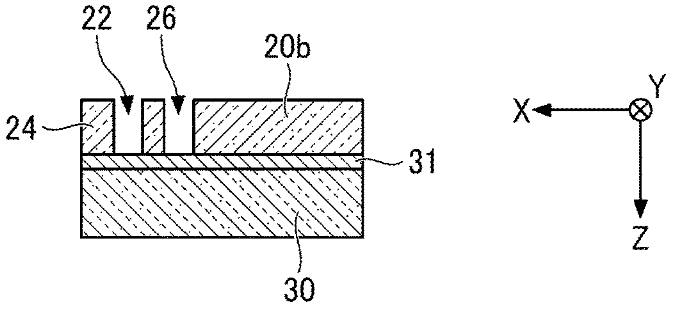
FIG. 13 is a cross-sectional view taken along line XIII-XIII in FIG. 12.

FIG. 10 is a cross-sectional view illustrating an example of a liquid discharge head 1*b* according to the present embodiment. FIG. 10 illustrates a cross section corresponding to a plane III in FIG. 2 of the liquid discharge head 1*b*. FIG. 11 is a plan view of the liquid discharge head 1*b* as seen from a nozzle plate 10 side. FIG. 12 is an enlarged plan view of a region XII in FIG. 11. FIG. 13 is a cross-sectional view taken along line XIII-XIII in FIG. 12.

As illustrated in FIGS. 10 to 13, the liquid discharge head 1*b* includes a channel substrate 20*b*. In the present embodiment, the channel substrate 20*b* includes a second recess 26 and a second flat portion 23*b*.

The second recess 26 is a recess formed on a lower surface of the channel substrate 20. The second recess 26 is disposed between the channel 21 and the first recess 22 in a plan view. In other words, the second recess 26 is disposed in a frame-shaped region located between the channel region 21A and the first recess 22 in a plan view.

The second flat portion 23*b* is a flat portion on the lower surface of the channel substrate 20*b*. The second flat portion 23*b* is disposed between the channel 21 and the second recess 26 in a plan view.

In the present embodiment, since the channel substrate 20*b* includes the second recess 26 and the second flat portion 23*b*, it is possible to prevent a defect occurring on an outer periphery of the channel substrate 20*b* from extending toward the inner side of the channel substrate 20*b* in a plan view. As a result, it is possible to reduce arrival of the defect to the channel 21 located on the inner side of the channel substrate 20*b* in a plan view. As a result, in the present embodiment, it is possible to reduce the deterioration in quality of the liquid discharge head 1 due to the defect and to provide the liquid discharge head 1*b* having an excellent quality.

In the present embodiment, the second recess 26 may be formed on an entire periphery of the channel 21 in a plan view. In this case, the second recess 26 is a groove formed on the entire periphery of the channel 21. The second flat portion 23*b* is a frame-shaped region located between the channel 21 and the second recess 26 in a plan view. With this configuration, regardless of a position on the outer periphery of the channel substrate 20*b* where the defect occurs, the second recess 26 and the second flat portion 23*b* can prevent the defect from extending toward the inner side of the channel substrate 20*b*. As a result, it is possible to reduce arrival of the defect occurring on the outer periphery of the channel substrate 20*b* to the channel 21 located on the inner side of the channel substrate 20*b* in a plan view, and to reduce deterioration in quality of the liquid discharge head 1*b* due to the defect. It is not necessary that the second recess 26 is formed on the entire periphery of the channel 21 in a plan view, and this may be formed in a part of the periphery of the channel 21.

In the example illustrated in FIG. 11, the configuration in which the shape of the second recess 26 formed on the entire periphery of the channel 21 is substantially rectangular in a plan view is exemplified, but there is no limitation, and the shape may be substantially circular, substantially triangular, and substantially polygonal.

Fourth Embodiment

Next, a liquid discharge head according to a fourth embodiment will be described. This embodiment is mainly different from the above-described embodiments in that a second recess includes multiple recesses formed at an interval in a direction along an outer periphery of a channel substrate in a plan view.

Figure 14:
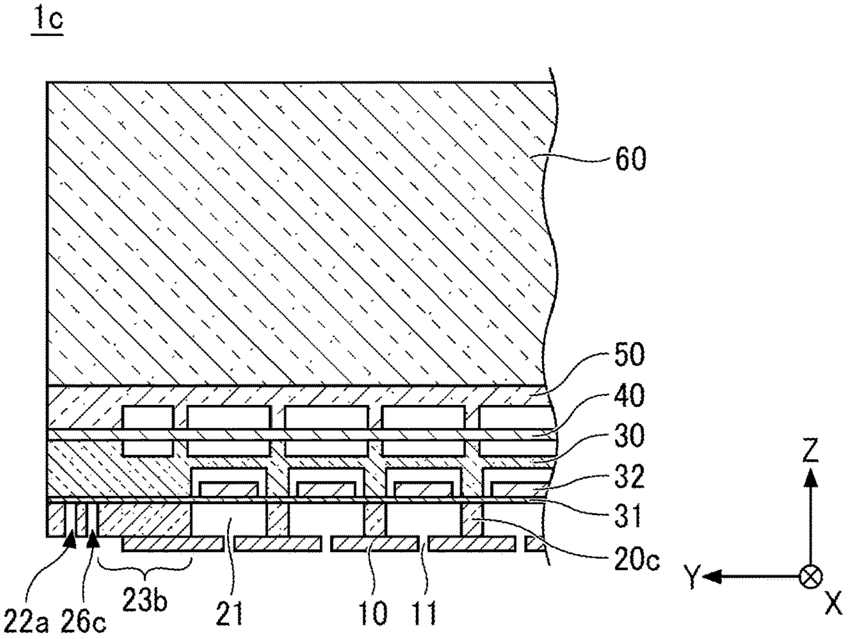
FIG. 14 is a cross-sectional view illustrating an example of a liquid discharge head according to a fourth embodiment.
Figure 15:
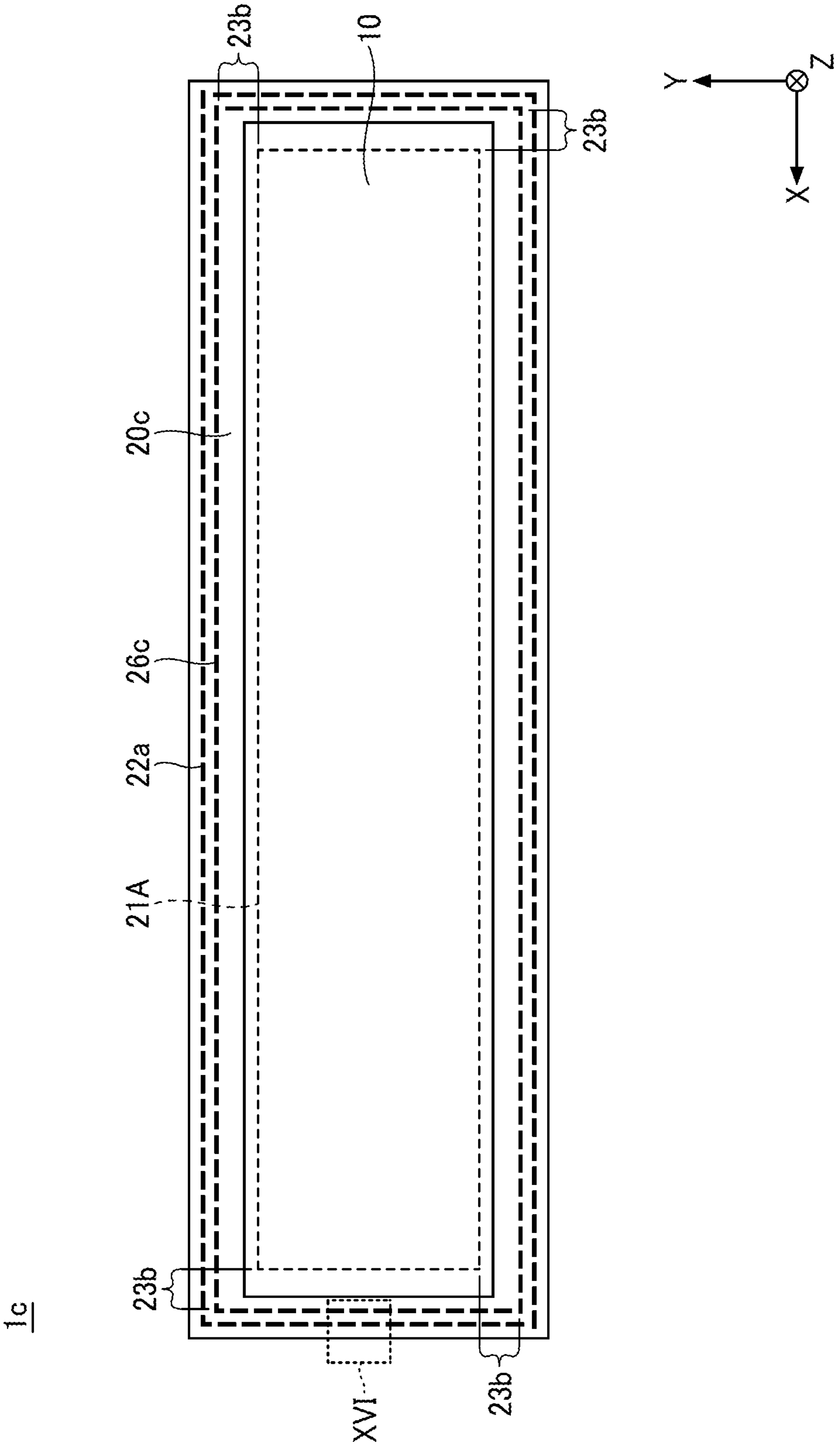
FIG. 15 is a plan view of the liquid discharge head in FIG. 14 as seen from a nozzle plate side.
Figure 16:
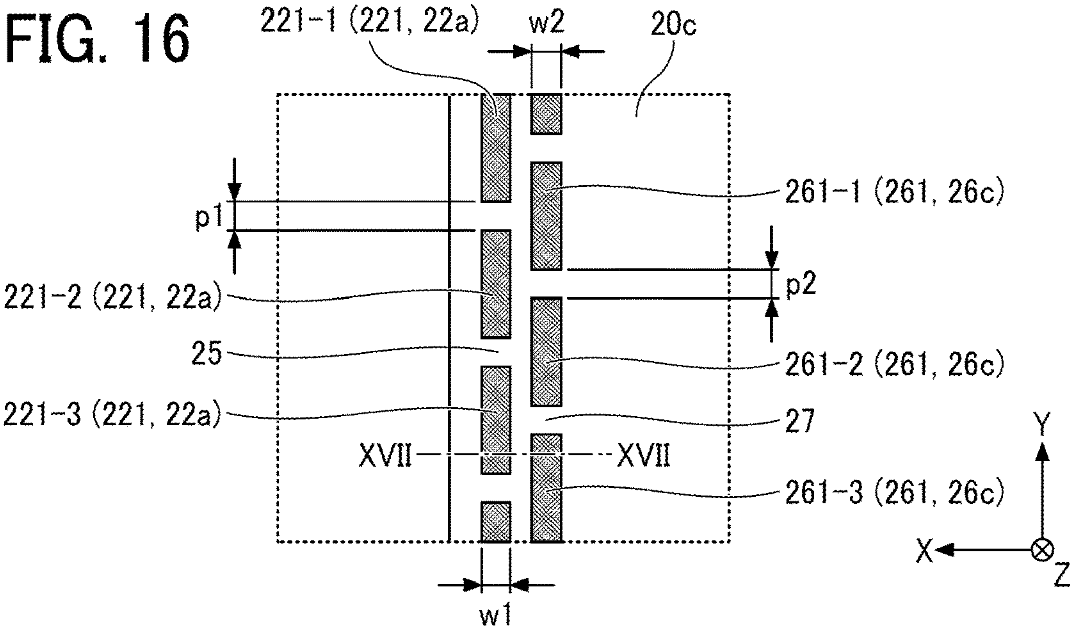
FIG. 16 is an enlarged plan view of a region XVI in FIG. 15.
Figure 17:
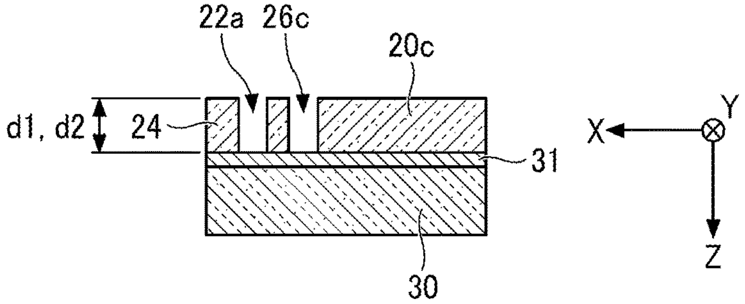
FIG. 17 is a cross-sectional view taken along line XVII-XVII in FIG. 16.

FIG. 14 is a cross-sectional view illustrating an example of a liquid discharge head 1*c* according to the present embodiment. FIG. 14 illustrates a cross section corresponding to a plane III in FIG. 2 in the liquid discharge head 1*c*. FIG. 15 is a plan view of the liquid discharge head 1 as seen from a nozzle plate 10 side. FIG. 16 is an enlarged plan view of a region XVI in FIG. 15. FIG. 17 is a cross-sectional view taken along line XVII-XVII in FIG. 16.

As illustrated in FIGS. 14 to 17, the liquid discharge head 1*c* includes a channel substrate 20*c*. In the present embodiment, the channel substrate 20*c* includes a first recess 22*a* and a second recess 26*c*. As illustrated in FIG. 16, the second recess 26*c* includes multiple recesses 261 discretely arranged at a second interval 27 in a direction along an outer periphery of the channel substrate 20*c* in a plan view. The direction along the outer periphery of the channel substrate 20*c* is a longitudinal direction of the channel substrate 20*c* (for example, an X direction) or a transverse direction of the channel substrate 20*c* (for example, a Y direction). In the example illustrated in FIG. 16, the direction along the outer periphery of the channel substrate 20*c* is the Y direction.

The second recess 26*c* includes multiple recesses 261 formed on an entire periphery of the channel region 21A, that is, the channel 21. In FIG. 16, recesses 261-1, 261-2, and 261-3 are a part of the multiple recesses 261 included in the second recess 26*c*.

For example, when the second recess is formed not discretely but continuously in the direction along the outer periphery of the channel substrate, a thickness in a direction orthogonal to the direction along the outer periphery of a portion between the first recess and the second recess in the channel substrate is reduced, and strength of this portion might be reduced. Due to the reduction in strength of the portion, a defect is likely to occur in the channel substrate according to an external force or an impact.

In the present embodiment, since the second recess 26*c* includes multiple discretely arranged recesses 261, the strength of the portion between the first recess 22*a* and the second recess 26*c* in the channel substrate 20*c* can be made higher than that in a case where the second recess is continuously formed. As a result, it is possible to reduce the occurrence of the defect in the channel substrate 20*c* and to provide the liquid discharge head 1*c* having an excellent quality.

In the present embodiment, as illustrated in FIG. 16, the first recess 22*a* may include multiple recesses 221 formed at a first interval 25 in the direction along the outer periphery of the channel substrate 20*c* in a plan view. The second recess 26*c* may be formed so as to face a portion in which the first interval 25 is provided in the first recess 22*a* in a plan view. A portion in which the second interval 27 is provided in the second recess 26*c* may be disposed so as to face the first recess 22*a*. With the above-described configuration, in the channel substrate 20*c*, the first recess 22*a* and the portion provided with the second interval 27 are arranged alternately or the second recess 26*c* and the portion provided with the first interval 25 are arranged alternately in a direction from an outer side to an inner side of the channel substrate 20*c* in a plan view. As a result, the strength of the channel substrate 20*c* can be increased as compared with a case where the first recess 22*a* and the second recess 26*c* are alternately arranged in the direction from the outer side toward the inner side of the channel substrate 20*c* and a case where the portion provided with the first interval 25 and the portion provided with the second interval 27 are alternately arranged in a plan view. It is possible to reduce occurrence of the defect in the channel substrate 20*c* and to provide the liquid discharge head 1*c* having an excellent quality.

In the present embodiment, as illustrated in FIG. 16, a minimum length p2 of the second interval 27 may be shorter than a maximum width w2 of the second recess 26*c* in the direction orthogonal to the direction along the outer periphery of the channel substrate 20*c* in a plan view. In a case where the direction along the outer periphery of the channel substrate 20*c* is the longitudinal direction of the channel substrate 20*c*, the direction orthogonal to the direction along the outer periphery of the channel substrate 20*c* is the transverse direction of the channel substrate 20*c*. In a case where the direction along the outer periphery of the channel substrate 20*c* is the transverse direction of the channel substrate 20*c*, the direction orthogonal to the direction along the outer periphery of the channel substrate 20*c* is the longitudinal direction of the channel substrate 20*c*. In the example illustrated in FIG. 16, the direction orthogonal to the direction along the outer periphery of the channel substrate 20*c* is the X direction.

By making the minimum length p2 shorter than the maximum width w2 in a plan view, the strength of the portion of the second interval 27 in the channel substrate 20*c* can be reduced. As a result, it is possible to reduce the extension of the defect occurring on the outer periphery of the channel substrate 20*c* to the inner side of the channel substrate 20*c* in a plan view, and to provide the liquid discharge head 1*c* having an excellent quality.

In the present embodiment, as illustrated in FIGS. 16 and 17, a length of the maximum depth d2 of the second recess 26*c* may be longer than the minimum length p2 of the second interval 27. With this configuration, it is possible to reduce the strength of the portion of the second interval 27 in the channel substrate 20*c*, reduce the extension of the defect occurring on the outer periphery of the channel substrate 20*c* to the inner side of the channel substrate 20*c* in a plan view, and to provide the liquid discharge head 1*c* having an excellent quality. In FIG. 17, since the maximum depth d2 of the second recess 26*c* is the same as the maximum depth d1 of the first recess 22*a*, these reference signs are also used.

In the example illustrated in FIG. 16, the configuration in which the shape of the second recess 26*c* formed on the entire periphery of the channel 21 is substantially rectangular in a plan view is exemplified, but there is no limitation, and the shape may be substantially circular, substantially triangular, and substantially polygonal.

Effects of the present embodiment other than those described in the description of the present embodiment are substantially the same as those of the first embodiment.

Examples and Comparative Examples

Hereinafter, Examples and Comparative Examples will be described. The present embodiment is not limited to these examples at all. In Examples 1 to 4 described below, configurations of liquid discharge heads are different from each other. Examples 1 to 3 are Examples, and Example 4 is a Comparative Example.

The configuration of the liquid discharge head according to Example 1 is the same as the configuration of the liquid discharge head 1 according to the first embodiment described above. The configuration of the liquid discharge head according to Example 2 is the same as the configuration of the liquid discharge head 1*a* according to the second embodiment described above. The configuration of the liquid discharge head according to Example 3 is the same as the configuration of the liquid discharge head 1*c* according to the fourth embodiment described above.

Figure 18:
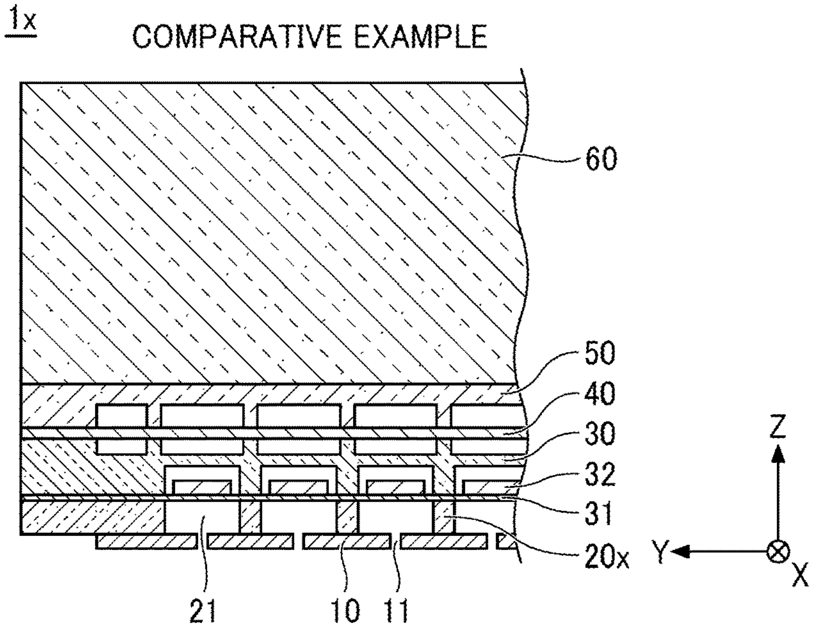
FIG. 18 is a cross-sectional view illustrating an example of a liquid discharge head according to a Comparative Example.
Figure 19:
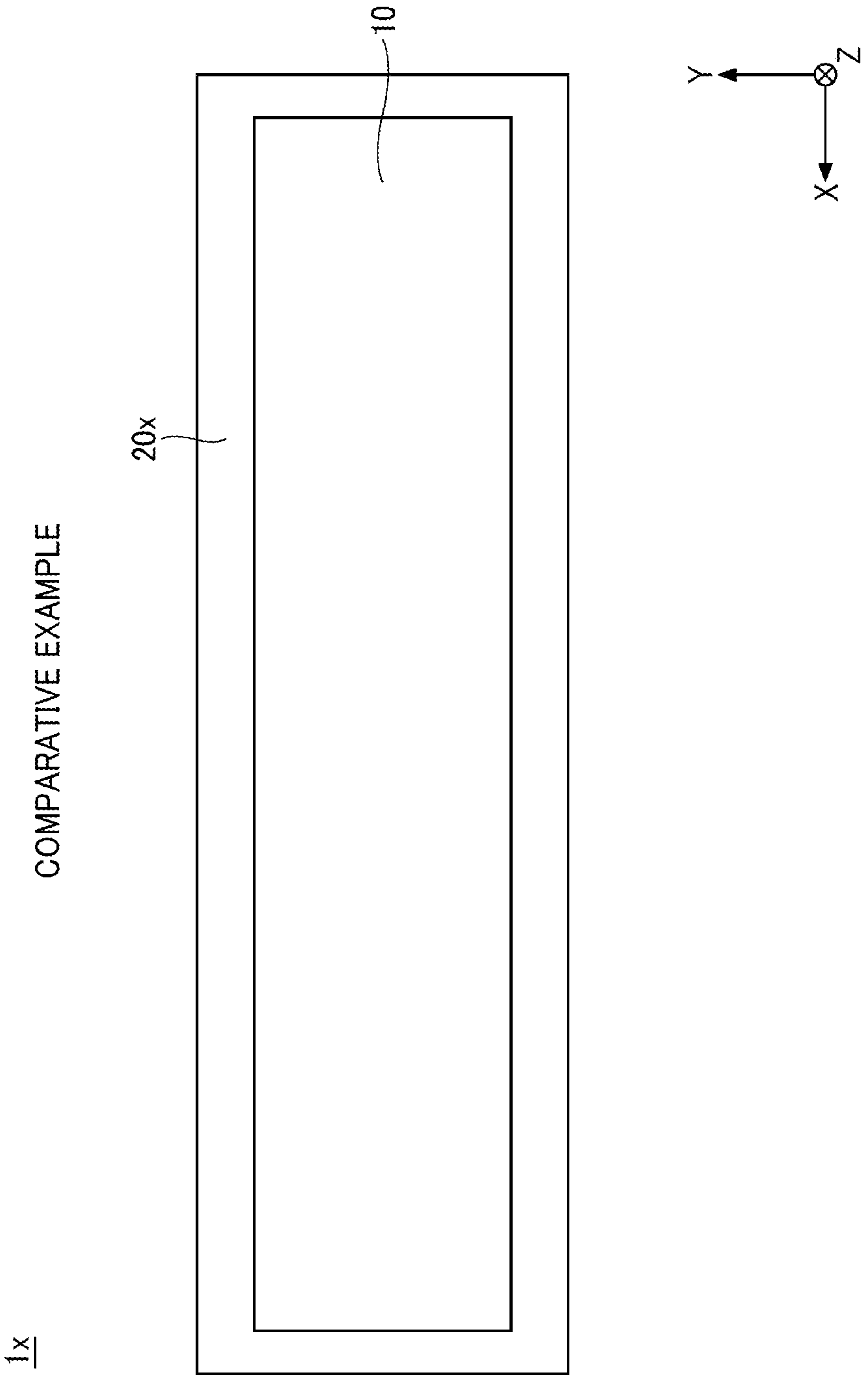
FIG. 19 is a plan view of the liquid discharge head in FIG. 18 as seen from a nozzle plate side.

FIG. 18 is a cross-sectional view illustrating an example of a liquid discharge head 1*x* according to Example 4. FIG. 18 illustrates a cross section corresponding to the plane III in FIG. 2 of the liquid discharge head 1*x*. FIG. 19 is a plan view of the liquid discharge head 1*x* as seen from a nozzle plate 10 side.

The liquid discharge head 1*x* is different from the liquid discharge heads according to Examples 1 to 3 in including a channel substrate 20*x*. The channel substrate 20*x* is different from the channel substrates according to Examples 1 to 3 in not including any of the first recess 22, the first recess 22*a*, the first flat portion 23, the second recess 26*c*, and the second flat portion 23*b*. In the liquid discharge head 1*x*, a component having substantially the same function as that of the components in the liquid discharge head 1, the liquid discharge head 1*a*, and the liquid discharge head 1*c* is denoted by the same reference sign for the sake of convenience.

In Examples and Comparative Examples, it was evaluated whether a defect occurring on an outer periphery of the channel substrate arrived at the channel in a case where each of the liquid discharge heads in Examples 1 to 4 was assembled by an assembling process of the liquid discharge head including an abutting operation on the outer periphery of the channel substrate. An arrival status of the defect to the channel was evaluated by observation using an infrared (IR) microscope.

A result of the above-described evaluation is illustrated in Table 1. Table 1 illustrates a quality abnormality occurrence rate and an N number in each of Examples 1 to 4. The quality abnormality means an abnormality in quality in the liquid discharge head such as leakage of liquid in the channel due to the defect occurring in the channel substrate, a change in volume of the channel, and disconnection of wiring provided in the vicinity of the channel. The N number means the number of samples, and herein represents the number of evaluated liquid discharge heads.

TABLE 1

| | QUALITY ABNORMALITY OCCURRENCE RATE [%] | N NUMBER |
|---|---|---|
| EXAMPLE 1 | 0 | 50 |
| EXAMPLE 2 | 0 | 50 |
| EXAMPLE 3 | 0 | 50 |
| EXAMPLE 4 | 12 | 50 |

As illustrated in Table 1, the quality abnormality occurrence rate in each of Examples 1 to 3 was lower than the quality abnormality occurrence rate in Example 4. In Example 4, it is considered that the defect occurring by the external force or impact applied from the outer periphery of the channel substrate extended to the inner side of the substrate, thereby increasing the quality abnormality occurrence rate. In contrast, in Examples 1 to 3, it is considered that the defect occurred by the external force or the impact applied from the outer periphery of the channel substrate is prevented from extending toward the channel by an action of the first recess 22, and the first flat portion 23, and this does not arrive at the channel, so that the occurrence of the quality abnormality is reduced.

From above, it has been found that Examples 1 to 3 are superior to Example 4 in terms of reducing the occurrence of quality abnormality and improving the quality of the liquid discharge head.

In Example 1, there was no defect that arrives at the channel, but there was a sample an outer periphery of which was missing in a wide range. In contrast, in Examples 2 and 3, there was no such a sample the outer periphery of which was missing in a wide range. In this respect, Example 2 and Example 3 were found to be more preferable than Example 1.

Fifth Embodiment

Next, a liquid discharge apparatus according to a fifth embodiment will be described with reference to FIGS. 20 and 21. Hereinafter, an ink cartridge using ink and a liquid discharge apparatus will be described as an example.

Figure 20:
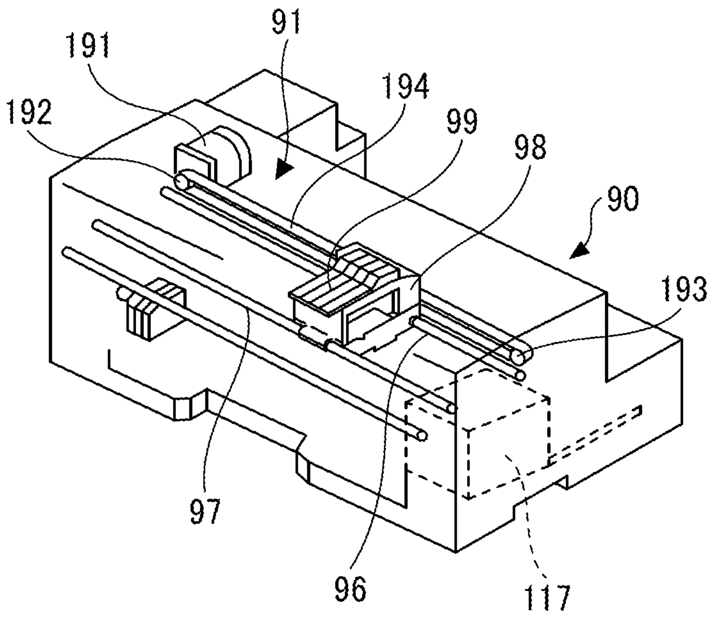
FIG. 20 is a perspective view of an example of a liquid discharge apparatus according to a fifth embodiment.
Figure 21:
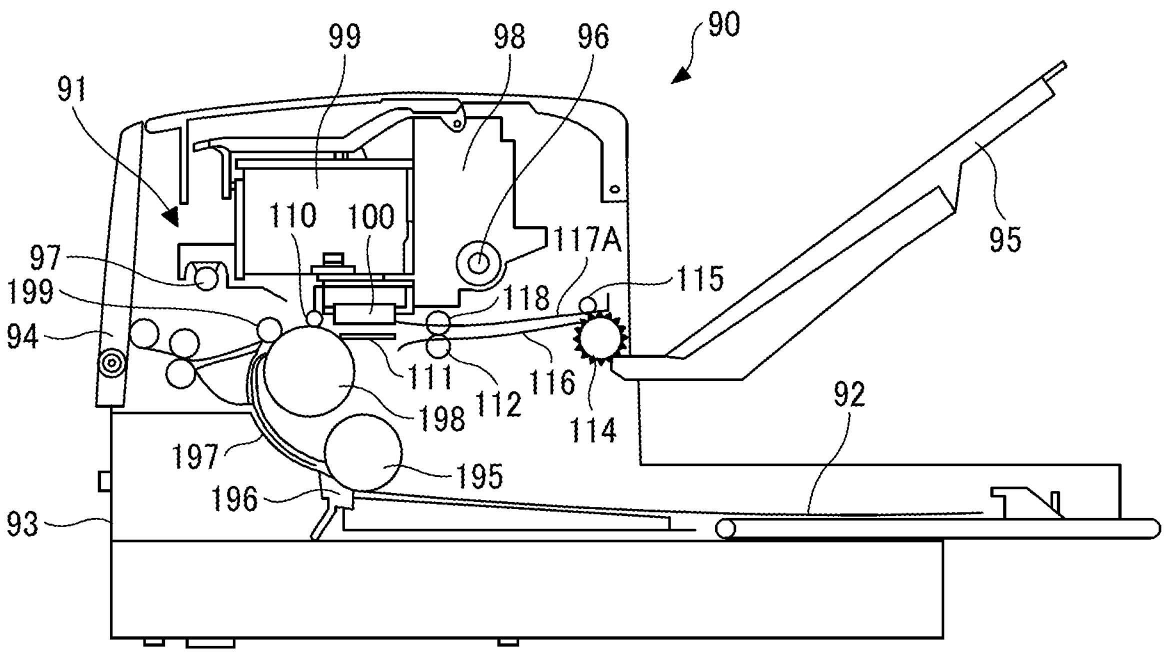
FIG. 21 is a side cross-sectional view of an example of the liquid discharge apparatus in FIG. 20.

FIG. 20 is a perspective view of an example of a liquid discharge apparatus 90 according to the present embodiment. FIG. 21 is a side cross-sectional view of an example of the liquid discharge apparatus 90. The liquid discharge apparatus 90 houses a carriage 98, a liquid discharge head 1, and a printing mechanism 91 in an apparatus main body. The carriage 98 is movable in a scanning direction. The liquid discharge head 1 is mounted on the carriage 98.

The carriage 98 may be equipped with a liquid discharge head 1*a*, a liquid discharge head 1*b*, or a liquid discharge head 1*c* in place of the liquid discharge head 1. The printing mechanism 91 includes an ink cartridge 99 for supplying ink to the liquid discharge head 1. The apparatus main body includes, on a lower portion thereof, a paper feeding cassette 93 (or a paper feeding tray) on which a large number of sheets 92 can be stacked so as to be removable from a front side.

The liquid discharge apparatus 90 also includes a manual paper feeding tray 94 that is opened to manually feed the sheet 92. The liquid discharge apparatus 90 takes in the sheet 92 fed from the paper feeding cassette 93 or the manual paper feeding tray 94, records an image on the sheet 92 by the printing mechanism 91, and then ejects the sheet 92 on which the image is recorded to a paper ejection tray 95 mounted on a rear side.

The printing mechanism 91 slidably holds a main guide rod 96, a sub-guide rod 97, and the carriage 98, which are guide members laterally bridged by left and right side plates, in a main-scanning direction.

The carriage 98 mounts the liquid discharge heads 1 that discharge ink droplets of yellow (Y), cyan (C), magenta (M), and black (K) arranged in such a manner that multiple ink discharge ports (nozzles) is arranged in a direction orthogonal to the main-scanning direction. The liquid discharge heads 1 are mounted so that the liquid discharge heads 1 discharge the ink droplets downward. Each ink cartridge 99 to supply ink of each color to the liquid discharge head 1 is exchangeably mounted on the carriage 98.

The ink cartridge 99 includes an atmosphere port communicating with the atmosphere on an upper side and a supply port for supplying ink to the liquid discharge head 1 on a lower side. The ink cartridge 99 includes a porous body filled with ink. The porous body maintains the ink supplied to the liquid discharge head 1 at a slight negative pressure by a capillary force thereof. In the present embodiment, the liquid discharge heads 1 of the respective colors are used; however, a single liquid discharge head including nozzles to discharge ink droplets of the respective colors may be used.

Here, the carriage 98 is slidably fitted to the main guide rod 96 on a rear side (downstream side in a sheet conveyance direction) and is slidably fitted to the sub-guide rod 97 on a front side (upstream side in the sheet conveyance direction). A timing belt 194 is stretched between a driving pulley 192 and a driven pulley 193 rotationally driven by the main scanning motor 191 to move and scan the carriage 98 in the main-scanning direction. The timing belt 194 is secured to the carriage 98. The carriage 98 reciprocates by forward and reverse rotation of the main scanning motor 191.

The liquid discharge apparatus 90 includes a paper feeding roller 195, a friction pad 196, a guide member 197, a conveyance roller 198, a conveyance roller 199, a leading end roller 110, and a print receiver 111. The paper feeding roller 195 and the friction pad 196 separate to feed the sheets 92 set in the paper feeding cassette 93. The guide member 197 guides the sheet 92. The conveyance roller 198 reverses to convey the fed sheet 92. The conveyance roller 199 is pressed against a peripheral surface of the conveyance roller 198. The leading end roller 110 defines a feeding angle of the sheet 92 from the conveyance roller 198. The conveyance roller 198 is rotationally driven by a sub scanning motor via a gear train.

The print receiver 111 as a sheet guide member is provided to guide the sheet 92 fed from the conveyance roller 198 below the liquid discharge head 1 in accordance with a movement range of the carriage 98 in the main-scanning direction. On the downstream side of the print receiver 111 in the sheet conveyance direction, a conveyance roller 112 and a spur 118 rotationally driven to feed the sheet 92 in the paper ejection direction are provided. A paper ejection roller 114 and a spur 115 for feeding the sheet 92 to the paper ejection tray 95, and guide members 116A and 117A forming a paper ejection path are further provided.

When recording by the liquid discharge apparatus 90 configured as described above, the liquid discharge head 1 is driven in accordance with an image signal while the carriage 98 is moved, so that ink is discharged onto the stopping sheet 92 to record one row. Thereafter, the liquid discharge apparatus 90 conveys the sheet 92 by a predetermined amount, and then records a next row. When the liquid discharge apparatus 90 receives a signal indicating an end of recording or a signal indicating that a rear end of the sheet 92 has reached a recording area, this terminates a recording operation and ejects the sheet 92.

A maintenance device 117 to recover the liquid discharge heads 1 from discharge failure is disposed at a position out of the recording area on a right end side in the moving direction of the carriage 98 (refer to FIG. 20). The maintenance device 117 includes a cap, a suction unit, and a cleaner. While standing by for printing, the carriage 98 moves to the maintenance device 117 side and caps the liquid discharge head 1 with the cap to keep the discharge port in a wet state to prevent occurrence of discharge failure due to ink drying. By discharging the ink irrelevant to recording during recording, viscosity of ink in all the discharge ports is kept constant, and a stable discharge state is maintained.

In a case where the discharge failure occurs, the nozzle of the liquid discharge head 1 is sealed by the cap, and bubble is sucked out together with the ink from the discharge port by the suction unit through a tube. Ink and dust adhering to a discharge port surface are removed by the cleaner, so that it recovers from the discharge failure. The sucked ink is discharged to a waste ink container disposed on a lower portion of an apparatus body, and is absorbed into and retained in an ink absorber in the waste ink container.

In this manner, since the liquid discharge head 1 according to the embodiment is mounted on the liquid discharge apparatus 90, stable ink discharge characteristics can be obtained and image quality can be improved.

Although a case where the liquid discharge head 1 is used in the liquid discharge apparatus 90 has been herein described, the liquid discharge head 1 may be applied to an apparatus that discharges droplets other than ink, for example, a liquid resist for patterning.

As is apparent from the above description, according to the present embodiment, it is possible to obtain an effect that a high-quality image can be stably obtained by the ink cartridge 99 including the liquid discharge head 1 and the liquid discharge apparatus 90.

Sixth Embodiment

Figure 22:
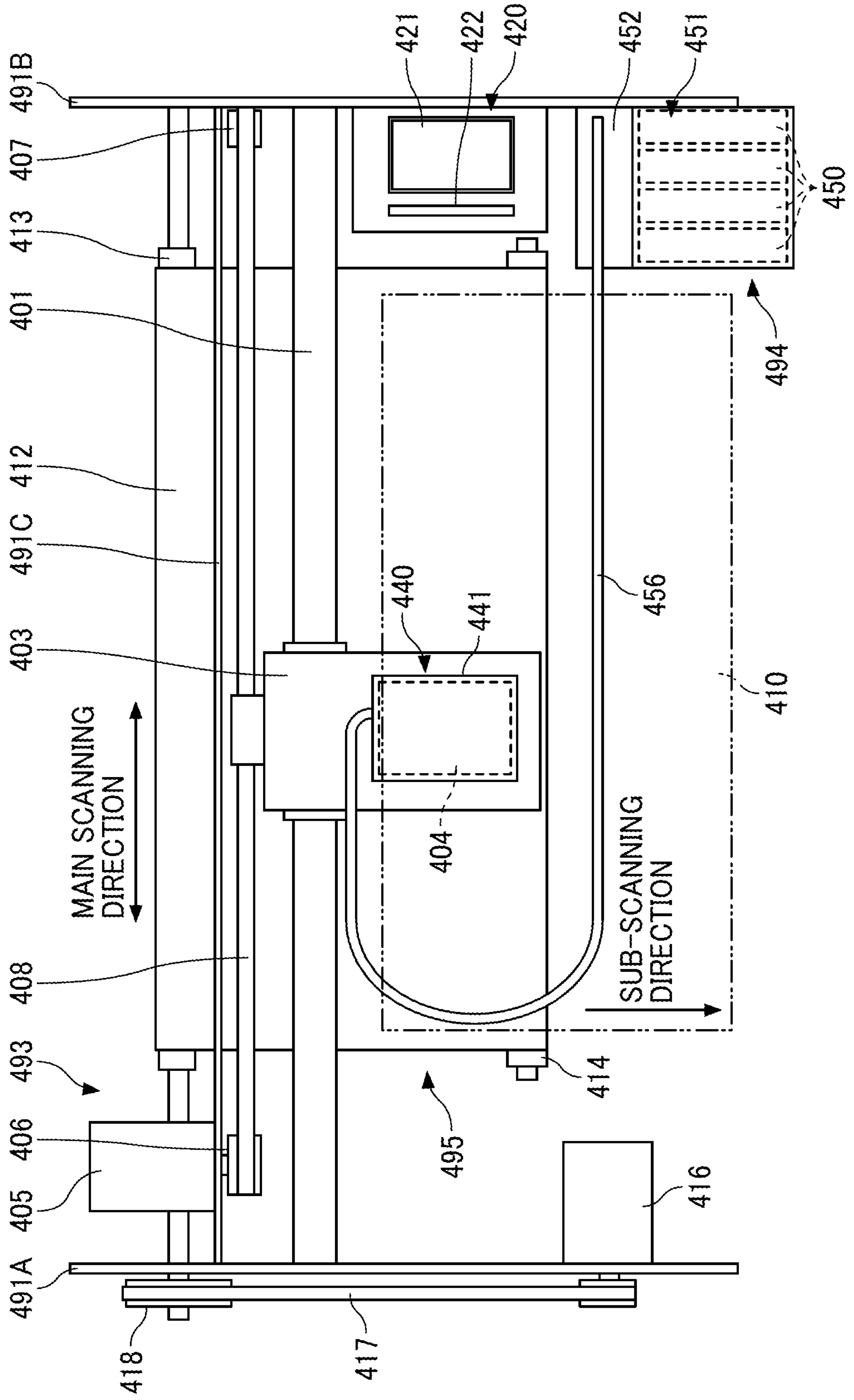
FIG. 22 is a plan view of an example of a liquid discharge apparatus according to a sixth embodiment.

Next, a liquid discharge apparatus as a liquid discharge apparatus according to the present embodiment will be described with reference to FIGS. 22 to 23. FIG. 22 is a plan view of an example of the liquid discharge apparatus according to the present embodiment.

Figure 23:
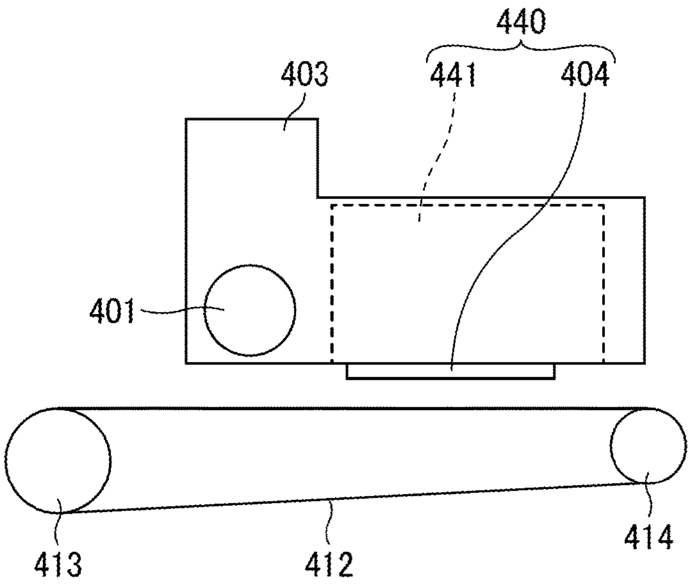
FIG. 23 is a side view of an example of the liquid discharge apparatus in FIG. 22.

FIG. 23 is a side view of an example of the liquid discharge apparatus according to the present embodiment.

The liquid discharge apparatus according to the present embodiment is a serial type apparatus. In this apparatus, a carriage 403 reciprocates in a main-scanning direction by a main scan moving unit 493. The main scan moving unit 493 includes a guide 401, a main scanning motor 405, and a timing belt 408. The guide 401 is bridged between a left side plate 491A and a right side plate 491B to movably hold the carriage 403. The main scanning motor 405 reciprocally moves the carriage 403 in the main-scanning direction via the timing belt 408 bridged between a driving pulley 406 and a driven pulley 407.

The carriage 403 is equipped with a liquid discharge device 440 formed by integrating a liquid discharge head 404 and a head tank 441. The liquid discharge head 404 may be any one of the liquid discharge head 1, the liquid discharge head 1*a*, the liquid discharge head 1*b*, or the liquid discharge head 1*c* described above.

The liquid discharge head 404 of the liquid discharge device 440 discharges liquid of each color, for example, yellow (Y), cyan (C), magenta (M), and black (K). In the liquid discharge head 404, a nozzle row including multiple nozzles is disposed in a sub-scanning direction orthogonal to the main-scanning direction. The liquid discharge head 404 is mounted on the liquid discharge device 440 in a direction in which the discharge direction of the droplets is downward.

The liquid stored in the liquid cartridges 450 is supplied to the head tank 441 by a supply unit 494 for supplying the liquid stored outside the liquid discharge head 404 to the liquid discharge head 404.

The supply unit 494 includes a cartridge holder 451 serving as a filling part on which the liquid cartridge 450 is mounted, a tube 456, a liquid feeder 452 including a liquid feed pump. The liquid cartridge 450 is detachably attached to the cartridge holder 451. The liquid feeder 452 supplies liquid from the liquid cartridge 450 to the head tank 441 via the tube 456.

The liquid discharge apparatus according to the present embodiment includes a conveyance unit 495 for conveying a sheet 410 as a recording medium. The conveyance unit 495 includes a conveyance belt 412 as a conveyance unit and a sub scanning motor 416 to drive the conveyance belt 412.

The conveyance belt 412 attracts the sheet 410 and conveys the sheet 410 at a position facing the liquid discharge head 404. The conveyance belt 412 is an endless belt. The conveyance belt 412 is bridged between a conveyance roller 413 and a tension roller 414. The attraction of the sheet 410 by the conveyance belt 412 can be performed by electrostatic adsorption and air adsorption.

The conveyance roller 413 is driven and rotated by the sub scanning motor 416 via a timing belt 417 and a timing pulley 418, so that the conveyance belt 412 circulates in the sub-scanning direction.

At one side in the main-scanning direction of the carriage 403, a maintenance unit 420 to maintain and recover the liquid discharge head 404 in good condition is disposed on a lateral side of the conveyance belt 412. The maintenance unit 420 includes, for example, a cap 421 for capping a nozzle surface (a surface on which the nozzles are formed) of the liquid discharge head 404, and a wiper 422 for wiping the nozzle surface.

The main scan moving unit 493, the supply unit 494, the maintenance unit 420, and the conveyance unit 495 are mounted on a housing that includes the left side plate 491A, the right side plate 491B, and a rear side plate 491C.

In the liquid discharge apparatus thus configured, the sheet 410 is conveyed on and attracted to the conveyance belt 412 and is conveyed in the sub-scanning direction by the circulation of the conveyance belt 412.

The liquid discharge apparatus drives the liquid discharge head 404 in response to image signals while moving the carriage 403 in the main-scanning direction, thereby discharging liquid to the stopping sheet 410 to form an image on the sheet 410.

In this manner, since the liquid discharge apparatus according to the present embodiment includes the liquid discharge head 404 according to the embodiment, this can stably form a high quality image.

Next, another embodiment of the liquid discharge device according to the present embodiment will be described below with reference to FIG. 24.

Figure 24:
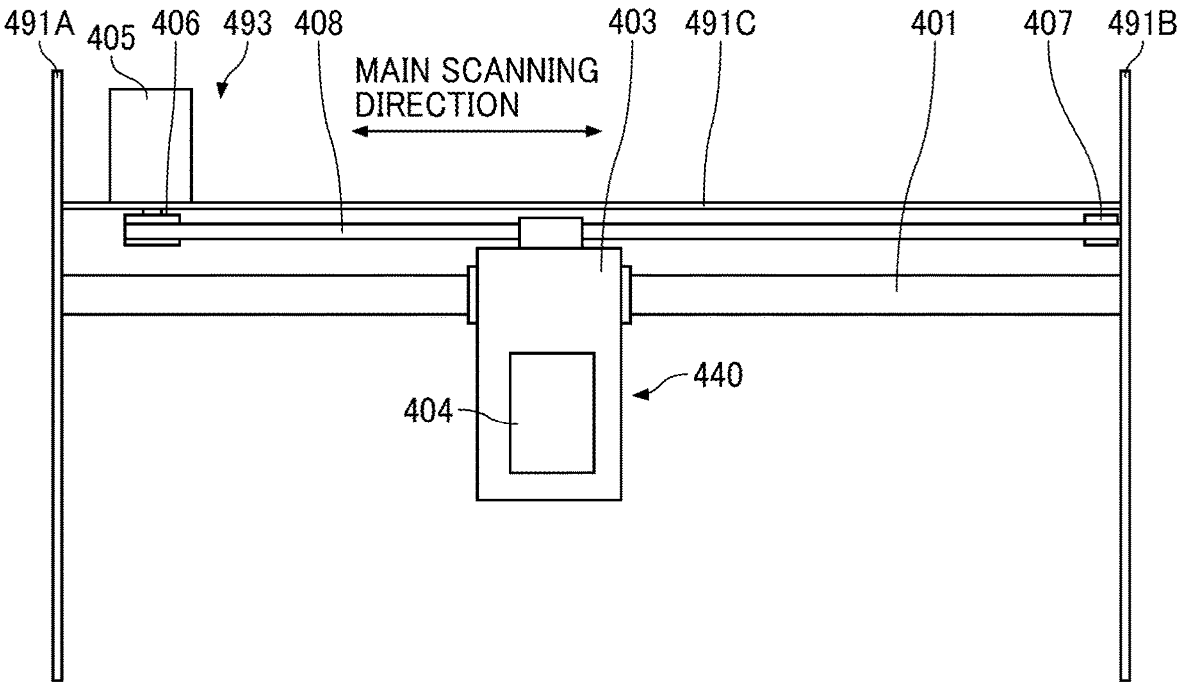
FIG. 24 is a front view of an example of a liquid discharge device according to a seventh embodiment.

FIG. 24 is a front view of an example of the liquid discharge device according to the present embodiment. A liquid discharge device 440 includes a housing formed of the left side plate 491A, the right side plate 491B, and a rear side plate 491C, a main scan moving unit 493, a carriage 403, and a liquid discharge head 404 among members forming the liquid discharge apparatus described above. The liquid discharge device 440 may further include at least one of a maintenance unit 420 and a supply unit 494 on the right side plate 491B, for example.

Still another embodiment of the liquid discharge device according to the present embodiment will be described below with reference to FIG. 25.

Figure 25:
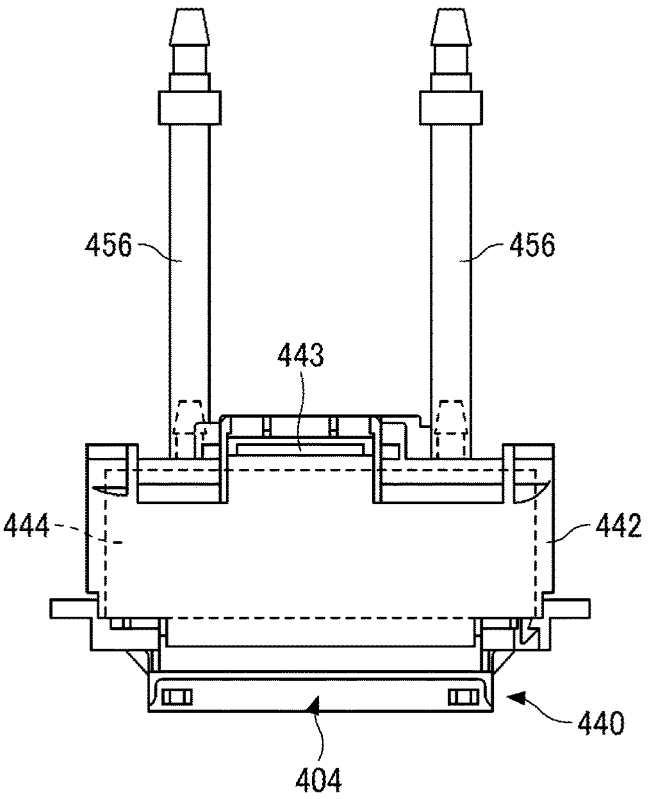
FIG. 25 is a front view of another example of the liquid discharge device in FIG. 24.

FIG. 25 is a front view of another example of the liquid discharge device according to the present embodiment. The liquid discharge device 440 includes a liquid discharge head 404 to which a channel part 444 is attached, and a tube 456 connected to the channel part 444. The channel part 444 is disposed inside a cover 442. Instead of the channel part 444, a head tank 441 may be included. A connector 443 electrically coupled to the liquid discharge head 404 is provided on an upper part of the channel part 444.

The liquid discharge apparatus according to the present embodiment includes the liquid discharge head 404 or the liquid discharge device 440 and drives the liquid discharge head 404 to discharge the liquid. The liquid discharge apparatus may be an apparatus capable of discharging liquid to a material to which liquid can adhere or an apparatus to discharge liquid toward gas or into liquid. The liquid discharge apparatus may include devices to feed, convey, and eject the material to which liquid can adhere, a pretreatment apparatus, and a post-treatment apparatus.

The liquid discharge apparatus may be, for example, an image forming apparatus to discharge ink to form an image on a sheet, or a stereoscopic fabrication apparatus (three-dimensional fabrication apparatus) to discharge a fabrication liquid to a powder layer in which powder material is formed in layers to form a stereoscopic fabrication object (three-dimensional fabrication object).

The liquid discharge apparatus is not limited to one in which significant images such as letters and graphics are visualized by the discharged liquid. For example, the liquid discharge apparatus may be an apparatus to form patterns not having meanings, or fabricate three-dimensional images.

The above-described term "material to which liquid can adhere" represents a material to which liquid can at least temporarily adhere, a material to which liquid adheres to be fixed, or a material to which liquid adheres to permeate. Specific examples include recording media such as paper sheet, recording paper, recording sheet of paper, film, and cloth, electronic components such as an electronic substrate and a piezoelectric element, and media such as a powder layer, an organ model, and a testing cell; any material to which liquid can adhere is included unless particularly limited.

Examples of the "material to which liquid can adhere" include any material to which liquid can adhere even temporarily, such as paper, thread, fiber, fabric, leather, metal, plastic, glass, wood, ceramic, construction materials such as wall paper or floor material, and cloth textile.

Examples of the "liquid" include ink, treatment liquid, DNA sample, resist, pattern material, binder, fabrication liquid, or solution and dispersion liquid including amino acid, protein, or calcium.

<Electrode Manufacturing Apparatus>

The "liquid discharge apparatus" according to the present embodiment may also include an apparatus for manufacturing an electrode and an electrochemical element that is also referred to as "an electrode manufacturing apparatus". The electrode manufacturing apparatus is described below.

Figure 26:
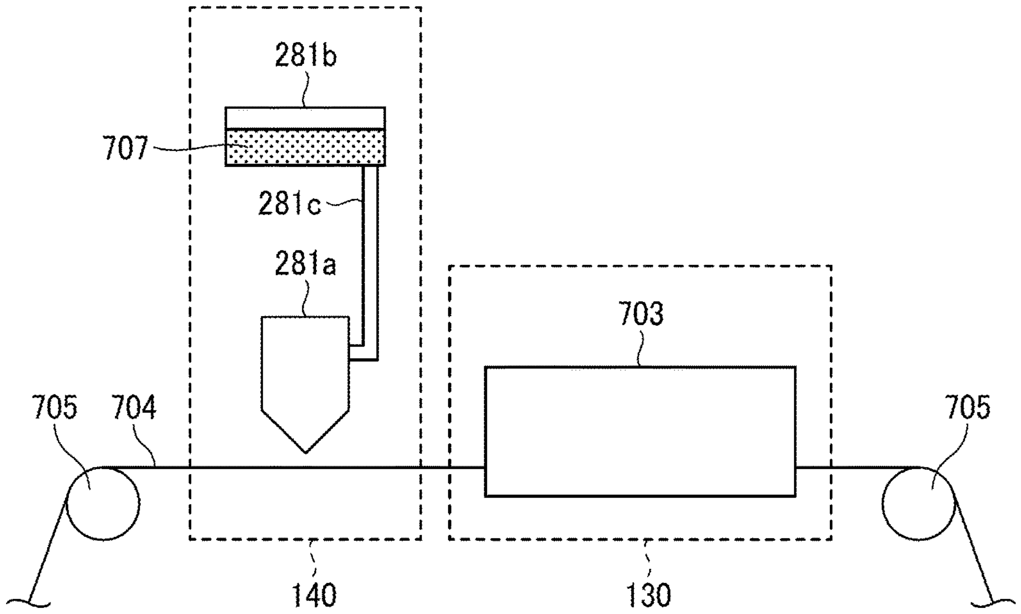
FIG. 26 is a schematic view of an example of an electrode manufacturing apparatus according to an embodiment of the present invention.

FIG. 26 is a schematic view of an example of an electrode manufacturing apparatus according to an embodiment of the present embodiment. The electrode manufacturing apparatus is an apparatus for manufacturing an electrode including a layer containing an electrode material by discharging a liquid composition using a head module including a liquid discharge head.

<Unit for Forming Layer Containing Electrode Material and Process of Forming Layer Containing Electrode Material>

A discharge unit in the electrode manufacturing apparatus illustrated in FIG. 26 is the head module according to the embodiment of the present disclosure. The liquid composition is discharged from the discharge head of the head module, and thus the liquid composition is applied onto the target object, and a liquid composition layer is formed. The target (hereinafter, may be referred to as "discharge target") is not particularly limited and may be appropriately selected depending on the intended purpose, as long as the target is a target on which a layer containing an electrode material is to be formed. Examples of the target object include an electrode substrate (current collector), an active material layer, and a layer containing a solid electrode material. The target object may be an electrode mixture layer containing an active material on an electrode substrate (current collector). The discharging unit and the discharging process may be a unit and a process of forming a layer containing an electrode material by directly discharging a liquid composition as long as the layer containing an electrode material can be formed on a discharge target (target object). The discharging unit and the discharging process may be a unit and a process of forming a layer containing an electrode material by indirectly discharging a liquid composition.

<Other Configurations and Other Processes>

Other configurations included in the apparatus for manufacturing an electrode mixture layer are not particularly limited and may be appropriately selected depending on the intended purpose, as long as the effects of the present embodiment are not impaired. Other processes included in the method for producing an electrode mixture layer are not particularly limited and may be appropriately selected depending on the intended purpose, as long as the effects of the present embodiment are not impaired. For example, the heating unit and the heating process are examples of the configuration and the process included in the manufacturing apparatus and the manufacturing method of the electrode mixture layer.

<Heaters and Heating Processes>

The heating unit included in the apparatus for manufacturing an electrode mixture layer is a unit that heats the liquid composition discharged by the discharging unit. The heating process included in the method for manufacturing an electrode mixture layer is a process of heating the liquid composition discharged in the discharging process. The liquid composition is heated to dry the liquid composition layer.

<Structure to Form a Layer Containing Electrode Material by Direct Discharge of Liquid Composition>

As an example of the electrode manufacturing apparatus, an electrode manufacturing apparatus for forming an electrode mixture layer containing an active material on an electrode substrate (current collector) is described below. As illustrated in FIG. 26, the electrode manufacturing apparatus includes a discharge process unit 140 and a heating process unit 130. The discharge process unit 140 performs a step of applying a liquid composition onto a printing base material 704 having a discharge target object to form a liquid composition layer. The heating process unit 130 performs a heating process of heating the liquid composition layer to obtain an electrode mixture layer.

The electrode manufacturing apparatus includes a conveyor 705 that conveys the printing base material 704. The conveyor 705 conveys the printing base material 704 to the discharge process unit 140 and the heating process unit 130 in this order at a preset speed. A method for manufacturing the printing base material 704 having the discharge target such as an active material layer is not particularly limited, and a known method can be appropriately selected. The discharge process unit 140 includes a liquid discharge head 281*a* that performs an application process of applying the liquid composition onto the printing base material 704, a storage container 281*b* that stores the liquid composition 707, and a supply tube 281*c* that supplies the liquid composition 707 stored in the storage container 281*b* to the liquid discharge head 281*a*.

The discharge process unit 140 discharges the liquid composition 707 from the liquid discharge head 281*a* so that the liquid composition 707 is applied onto the printing base material 704 to form a liquid composition layer in a thin film shape. The storage container 281*b* may be formed together with the electrode manufacturing apparatus such as the apparatus for manufacturing the electrode mixture layer as a single body. The storage container 281*b* may be detachable from the electrode manufacturing apparatus such as the apparatus for manufacturing the electrode mixture layer. The storage container 281*b* may be a container formed together with the apparatus for manufacturing the electrode mixture layer. The storage container 281*b* may be a container additionally detachable from the apparatus for manufacturing the electrode mixture layer.

The storage container 281*b* and the supply tube 281*c* can be arbitrarily selected as long as the liquid composition 707 can be stably stored and supplied to the liquid discharge head 281*a*.

The heating process unit 130 performs a solvent removal process of heating and removing the solvent remaining in the liquid composition layer. Specifically, the solvent remaining in the liquid composition layer is heated and dried by the heating device 703 of the heating process unit 130, and thus the solvent is removed from the liquid composition layer. Thus, the electrode mixture layer is formed. The solvent removal process in the heating process unit 130 may be performed under reduced pressure.

The heating device 703 is not particularly limited and may be appropriately selected depending on the intended purpose.

For example, the heating device 703 may be a substrate heater, an infrared (IR) heater, a hot air heater, or the like.

The heating device 703 may be a combination of at least two of the substrate heater, the IR heater, and the hot air heater. A heating temperature and heating time can be appropriately selected according to a boiling point of the solvent contained in the liquid composition 707 or the thickness of a formed film.

The electrode manufacturing apparatus according to the embodiment of the present disclosure is used to discharge the liquid composition onto a desired target place of the discharge target. The electrode mixture layer can be suitably used as, for example, a part of the configuration of an electrochemical element. The configuration of the electrochemical element other than the electrode mixture layer is not particularly limited, and a known configuration can be appropriately selected. For example, as a configuration other than the electrode mixture layer, the electrochemical element may include a positive electrode, a negative electrode, a separator, for example.

The liquid discharge apparatus is not limited to an apparatus in which the liquid discharge head moves relative to the material to which liquid can adhere. As a specific example, a serial type apparatus that moves the liquid discharge head or a line type apparatus that does not move the liquid discharge head are included.

Examples of the liquid discharge apparatus further include a treatment liquid applying apparatus to discharge a treatment liquid to a sheet to apply the treatment liquid to a sheet surface to reform the sheet surface, and an injection granulation apparatus in which a composition liquid including raw materials dispersed in a solution is injected through nozzles to granulate fine particles of the raw materials.

The term "liquid discharge device" represents a structure including the liquid discharge head and a functional part or mechanism combined thereto to form a single unit, an assembly of parts relating to liquid discharge. For example, the liquid discharge device includes a combination of the liquid discharge head with at least one of a head tank, a carriage, a supply unit, a maintenance unit, and a main scan moving unit.

Examples of the "single unit" include, for example, a combination in which the liquid discharge head and functional parts and mechanisms are secured to each other through fastening, bonding, or engaging, and a combination in which one of the liquid discharge head and the functional parts and mechanisms is movably held by another. The liquid discharge head may be detachably attached to the functional part(s) or mechanism(s) each other.

The liquid discharge device may be, for example, formed by the liquid discharge head and the head tank as a single unit, such as the liquid discharge device 440 illustrated in FIG. 24. Alternatively, the liquid discharge head and the head tank are coupled to each other with a tube to form a single unit. A unit including a filter may be added between the head tank of the liquid discharge head and the liquid discharge head.

The liquid discharge head and the carriage may form the liquid discharge device as a single unit.

In still another example, the liquid discharge device includes the liquid discharge head movably held by a guide member that forms a part of the main scan moving unit, so that the liquid discharge head and the main scan moving unit form a single unit. The liquid discharge head, the carriage, and the main scan moving unit may form the liquid discharge device as a single unit.

In still another example, the cap that forms a part of the maintenance unit may be secured to the carriage to which the liquid discharge head is attached so that the liquid discharge head, the carriage, and the maintenance unit form a single unit as the liquid discharge device.

A tube may be coupled to the liquid discharge head to which either the head tank or the channel part is attached, so that the liquid discharge head and the supply unit form a single unit as the liquid discharge device.

The main scan moving unit may include a single guide member. The supply unit may include a single tube or a single loader.

The pressure generator used in the liquid discharge head is not limited. The pressure generator is not limited to a piezoelectric actuator (or that using a laminated piezoelectric element), and may be, for example, a thermal actuator that employs an electrothermal transducer element such as a thermal resistor, or an electrostatic actuator including a diaphragm and opposed electrodes.

The terms “image formation”, “recording”, “printing”, “image printing”, and “fabricating” used herein may be used synonymously with each other.

Although the preferred embodiments have been described in detail above, it is not limited to the above-described embodiments, and various modifications and substitutions can be made to the above-described embodiments without departing from the scope recited in claims.

According to the present embodiment, it is possible to provide a liquid discharge head, a liquid discharge module, and a liquid discharge apparatus having excellent quality.

Aspects of the present embodiment are, for example, as follows.

According to a first aspect, a liquid discharge head includes a nozzle plate including a nozzle configured to discharge liquid, and a channel substrate including a channel communicating with the nozzle, the nozzle plate disposed so as to overlap with the channel substrate in a plan view, and the channel substrate including a first recess in a cross-sectional view disposed on an outer side of the channel in a plan view, and a flat portion disposed between the channel and the first recess in a plan view.

According to a second aspect, in the liquid discharge head of the first aspect, the first recess is a hole penetrating the channel substrate in a thickness direction of the channel substrate.

According to a third aspect, in the liquid discharge head of the first or second aspect, the first recess is formed on an entire periphery of the channel in a plan view.

According to a fourth aspect, in the liquid discharge head of any one of the first to third aspects, the first recess includes multiple recesses discretely formed at a first interval in a direction along an outer periphery of the channel substrate in a plan view.

According to a fifth aspect, in the liquid discharge head of the fourth aspect, a minimum length of the first interval is shorter than a maximum width of the first recess in a direction orthogonal to the direction along the outer periphery of the channel substrate in a plan view.

According to a sixth aspect, in the liquid discharge head of the fifth aspect, a length of a maximum depth of the first recess is longer than the minimum length of the first interval.

According to a seventh aspect, in the liquid discharge head of any one of the first to sixth aspects, the channel substrate includes a second recess disposed between the channel and the first recess, and a second flat portion disposed between the channel and the second recess in a plan view.

According to an eighth aspect, in the liquid discharge head of the seventh aspect, the second recess is formed on an entire periphery of the channel in a plan view.

According to a ninth aspect, in the liquid discharge head of the seventh or eighth aspect, the second recess includes multiple recesses discretely formed at a second interval in a direction along an outer periphery of the channel substrate in a plan view.

According to a tenth aspect, in the liquid discharge head of the ninth aspect, the first recess includes multiple recesses formed at a first interval in a direction along an outer periphery of the channel substrate in a plan view, the second recess is formed so as to face a portion provided with the first interval in the first recess in a plan view, and a portion provided with the second interval in the second recess is disposed so as to face the first recess.

According to an eleventh aspect, in the liquid discharge head of the ninth aspect, a minimum length of the second interval in the second recess is shorter than a maximum width of the second recess in a direction orthogonal to a direction along an outer periphery of the channel substrate in a plan view.

According to a twelfth aspect, in the liquid discharge head of the ninth aspect, a maximum width of a depth of the second recess is shorter than a minimum length of the second interval in the second recess.

According to a thirteenth aspect, in the liquid discharge head of any one of the first to twelfth aspects, the channel substrate contains silicon.

According to a fourteenth aspect, in the liquid discharge head of any one of the first to thirteenth aspects, the nozzle plate contains silicon.

According to a fifteenth aspect, a liquid discharge module includes multiple liquid discharge heads including the liquid discharge head of any one of the first to thirteenth aspects.

According to a sixteenth aspect, a liquid discharge apparatus includes the liquid discharge head of any one of the first to thirteenth aspects.

[Aspect 1]

A liquid discharge head (1) includes: a nozzle plate (10) having multiple nozzles (11) from each of which a liquid is to be discharged, the multiple nozzles (11) arrayed in a longitudinal direction of the nozzle plate (10); a channel substrate (20) on the nozzle plate (10) in a lamination direction orthogonal to the longitudinal direction, the channel substrate (20) including: multiple channels (21) arrayed in the longitudinal direction in a channel region (21A) of the channel substrate (20), the multiple channels (21) respectively communicating with the multiple nozzles (11); a first recess (22) outside the channel region (21A) in the longitudinal direction; and a first flat portion (23) between the channel region (21A) and the first recess (22) in the longitudinal direction.

[Aspect 2]

In the liquid discharge head (1) according to aspect 1, the first recess (22) is a hole penetrating through the channel substrate (20) in the lamination direction.

[Aspect 3]

In the liquid discharge head (1) according to aspect 1 or 2, the first recess (22) surrounds a periphery of the channel region (21A) on a plane of the channel substrate (20).

[Aspect 4]

In the liquid discharge head (1) according to any one of aspects 1 to 3, the first recess (22) includes multiple recesses discrete at a first interval (25) around the periphery of the channel region (21A) on the plane of the channel substrate (20).

[Aspect 5]

In the liquid discharge head (1) according to aspect 4, the first interval (25) between the multiple recesses has a minimum length (p1) in a first direction in which the multiple recesses are arranged, the multiple recesses have a maximum width (w1) in a second direction orthogonal to the first direction, and the minimum length (p1) of the first interval (25) is shorter than the maximum width (w1) of the multiple recesses.

[Aspect 6]

In the liquid discharge head (1) according to aspect 5, a maximum depth (d1) of each of the multiple recesses in the lamination direction is greater than the minimum length (p1) of the first interval (25).

[Aspect 7]

In the liquid discharge head (1) according to any one of aspects 1 to 6, the channel substrate further includes: a second recess (26) between the channel region and the first recess (22) in the longitudinal direction; and a second flat portion (23*b*) between the channel region (21A) and the second recess (26) in the longitudinal direction.

[Aspect 8]

In the liquid discharge head (1) according to aspect 7, the second recess (26) surrounds a periphery of the channel region (21A) on a plane of the channel substrate (20), and the first recess (22) surrounds a periphery of the second recess (26) on the plane of the channel substrate (20).

[Aspect 9]

In the liquid discharge head (1) according to aspect 7 or 8, the second recess (26) includes multiple recesses discrete at a second interval (27) around the periphery of the channel region (21A) on the plane of the channel substrate (20).

[Aspect 10]

In the liquid discharge head (1) according to aspect 9, the first recess (22) includes multiple recesses discrete at a first interval (25) around the periphery of the channel region (21A) on the plane of the channel substrate (20), the second recess (26) faces a first space, between the multiple recesses of the first recess (22) having the first interval (25), in the longitudinal direction, and the first recess (22) faces a second space, between the multiple recesses of the second recess (26) having the second interval (27), in the longitudinal direction.

[Aspect 11]

In the liquid discharge head according to aspect 9, the second interval (27) between the multiple recesses has a minimum length (p2) in a first direction in which the multiple recesses are arranged, the multiple recesses have a maximum width (w2) in a second direction orthogonal to the first direction, and the minimum length (p2) of the second interval (25) is shorter than the maximum width (w2) of the multiple recesses.

[Aspect 12]

In the liquid discharge head (1) according to aspect 9, a maximum depth (d2) of each of the multiple recesses of the second recess (26) in the lamination direction is greater than the minimum length (p2) of the second interval (27).

[Aspect 13]

In the liquid discharge head (1) according to any one of aspects 1 to 12, the channel substrate (20) contains silicon.

[Aspect 14]

In the liquid discharge head (1) according to any one of aspects 1 to 13, the nozzle plate (10) contains silicon.

[Aspect 15]

A liquid discharge module (100) includes multiple liquid discharge heads (1) including the liquid discharge head (1) according to any one of aspects 1 to 13.

[Aspect 16]

A liquid discharge apparatus (90) includes the liquid discharge head (1) according to any one of aspects 1 to 13.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A liquid discharge head comprising:

a nozzle plate having multiple nozzles from each of which a liquid is to be discharged, the multiple nozzles arrayed in a longitudinal direction of the nozzle plate;

a channel substrate laminated on the nozzle plate in a lamination direction orthogonal to the longitudinal direction, the channel substrate including:

multiple channels arrayed in the longitudinal direction in a channel region of the channel substrate, the multiple channels respectively communicating with the multiple nozzles;

a first recess outside the channel region in the longitudinal direction; and a flat portion between the channel region and the first recess in the longitudinal direction, wherein the first recess includes multiple recesses spaced apart by a first interval, with the channel substrate positioned between each of the multiple recesses, around a periphery of the channel region of the channel substrate.

2. The liquid discharge head according to claim 1, wherein each of the multiple recesses of the first recess is a hole penetrating through the channel substrate in the lamination direction.

3. The liquid discharge head according to claim 1, wherein the first interval between the multiple recesses has a minimum length in a first direction in which the multiple recesses are arranged, the multiple recesses have a maximum width in a second direction orthogonal to the first direction, and the minimum length of the first interval is shorter than the maximum width of the multiple recesses.

4. The liquid discharge head according to claim 3, wherein a maximum depth of each of the multiple recesses in the lamination direction is greater than the minimum length of the first interval.

5. The liquid discharge head according to claim 1, wherein the channel substrate further includes:

a second recess between the channel region and the first recess in the longitudinal direction; and a second flat portion between the channel region and the second recess in the longitudinal direction.

6. The liquid discharge head according to claim 5, wherein the second recess includes multiple recesses spaced apart by a second interval, with the channel substrate positioned between each of the multiple recesses, around the periphery of the channel region the channel substrate.

7. The liquid discharge head according to claim 6, the second recess faces the channel substrate, between the multiple recesses of the first recess having the first interval, in the longitudinal direction, and the first recess faces the channel substrate, between the multiple recesses of the second recess having the second interval, in the longitudinal direction.

8. The liquid discharge head according to claim 6, wherein the second interval between the multiple recesses has a minimum length in a first direction in which the multiple recesses are arranged, the multiple recesses have a maximum width in a second direction orthogonal to the first direction, and the minimum length of the second interval is shorter than the maximum width of the multiple recesses.

9. The liquid discharge head according to claim 6, wherein a maximum depth of each of the multiple recesses of the second recess in the lamination direction is greater than the minimum length of the second interval.

10. The liquid discharge head according to claim 1, wherein the channel substrate contains silicon.

11. The liquid discharge head according to claim 1, wherein the nozzle plate contains silicon.

12. A liquid discharge module comprising:

multiple liquid discharge heads including the liquid discharge head according to claim 1.

13. A liquid discharge apparatus comprising the liquid discharge head according to claim 1.

14. The liquid discharge head according to claim 1, wherein the first recess is formed at an edge of the channel substrate such that the first recess is located outside the nozzle plate as viewed in the lamination direction.

15. A liquid discharge head comprising:

a nozzle plate having multiple nozzles from each of which a liquid is to be discharged, the multiple nozzles arrayed in a longitudinal direction of the nozzle plate;

a channel substrate laminated on the nozzle plate in a lamination direction orthogonal to the longitudinal direction, the channel substrate including:

multiple channels arrayed in the longitudinal direction in a channel region of the channel substrate, the multiple channels respectively communicating with the multiple nozzles;

a first recess continuously surrounding the channel region, the first recess penetrating through the channel substrate in the lamination direction;

a flat portion disposed between the channel region and the first recess in the longitudinal direction;

a second recess continuously surrounding the channel region, the second recess penetrating through the channel substrate in the lamination direction; and a second flat portion disposed between the channel region and the second recess in the longitudinal direction.

* * * * *